US011207608B2

(12) United States Patent
Andersson et al.

(10) Patent No.: US 11,207,608 B2
(45) Date of Patent: Dec. 28, 2021

(54) MEDIA SYNCHRONIZED CONTROL OF PERIPHERALS

(71) Applicant: OpenTV, Inc., San Francisco, CA (US)

(72) Inventors: Claes Georg Andersson, Berkeley, CA (US); John Michael Teixeira, Oakland, CA (US); Nicholas Daniel Doerring, San Francisco, CA (US); Nicholas Fishwick, San Francisco, CA (US); Colin Reed Miller, Mountain View, CA (US)

(73) Assignee: OPENTV, INC., San Francisco, CA (US)

( * ) Notice: Subject to any disclaimer, the term of this patent is extended or adjusted under 35 U.S.C. 154(b) by 287 days.

(21) Appl. No.: 15/811,053

(22) Filed: Nov. 13, 2017

(65) Prior Publication Data
US 2018/0065057 A1 Mar. 8, 2018

Related U.S. Application Data

(63) Continuation of application No. 14/588,327, filed on Dec. 31, 2014, now Pat. No. 9,833,723.

(51) Int. Cl.
A63H 30/04 (2006.01)
G06F 13/10 (2006.01)
(Continued)

(52) U.S. Cl.
CPC ............ *A63H 30/04* (2013.01); *G06F 3/00* (2013.01); *G06F 13/102* (2013.01);
(Continued)

(58) Field of Classification Search
CPC ..... G06F 3/00; G06F 13/102; H04N 21/4131; H04N 21/42202; H04N 21/4307; A63H 30/04
(Continued)

(56) References Cited

U.S. PATENT DOCUMENTS 8,312,486 B1    11/2012  Briggs et al.
9,440,158 B1 *   9/2016  Yano .................... A63F 13/20
(Continued)

FOREIGN PATENT DOCUMENTS

EP    2501144 A2      9/2012
WO    2011/078796 A1  6/2011

OTHER PUBLICATIONS

Extended European Search Report for related EP Patent Application No. 15199700 4, dated Apr. 26, 2016, in 8 pages.

*Primary Examiner* — Idriss N Alrobaye
*Assistant Examiner* — Brooke J Taylor
(74) *Attorney, Agent, or Firm* — Polsinelli LLP

(57) ABSTRACT

A computer system and method for synchronizing actions associated with media between a media/network device and peripherals. In an example implementation, a system includes a one or more processors configured to receive, by a communication module from a media/network device based on peripheral addressing information, a peripheral payload including a first set of actions and timing information related to media. The one or more processors perform the first set of actions based on the peripheral payload, generate response data for the first set of actions, and transmit the response data to the media/network device via a wireless network.

17 Claims, 20 Drawing Sheets

(51) Int. Cl.
*H04N 21/41* (2011.01)
*H04N 21/422* (2011.01)
*H04N 21/43* (2011.01)
*G06F 3/00* (2006.01)
*G06F 3/01* (2006.01)

(52) U.S. Cl.
CPC ... *H04N 21/4131* (2013.01); *H04N 21/42202* (2013.01); *H04N 21/4307* (2013.01); *G06F 3/016* (2013.01)

(58) Field of Classification Search
USPC .......................................................... 710/8
See application file for complete search history.

(56) References Cited

U.S. PATENT DOCUMENTS

| | | | |
|---|---|---|---|
| 2004/0117858 A1* | 6/2004 | Boudreau | H04N 21/4305 725/144 |
| 2008/0005679 A1* | 1/2008 | Rimas-Ribikauskas | G06F 1/1632 715/745 |
| 2008/0194175 A1* | 8/2008 | Last | G06F 3/002 446/302 |
| 2012/0023055 A1* | 1/2012 | Dagaeff | H04N 21/8133 706/47 |
| 2012/0036538 A1 | 2/2012 | Kudelski | |
| 2013/0044570 A1* | 2/2013 | Mkrtchyan | A63H 3/28 367/197 |
| 2014/0310424 A1* | 10/2014 | Andersson | H04L 65/4084 709/231 |

\* cited by examiner

MEDIA SYNCHRONIZED CONTROL OF PERIPHERALS

RELATED APPLICATIONS INFORMATION

This application is a continuation of U.S. patent application Ser. No. 14/588,327, filed on Dec. 31, 2014, which is incorporated herein by reference in its entirety as if set forth in full.

DESCRIPTION OF RELATED ART

Media producers derive significant revenue from associated merchandise, e.g. toys such as Buzz Lightyear doll produced by Disney as a companion to Toy Story. Some of these types of toys contain sophisticated electronics that allow the toy to be controlled externally, e.g. via voice or via data sent to the toy over a wireless network.

BRIEF DESCRIPTION OF THE DRAWINGS

Embodiments are illustrated in the figures of the accompanying drawings, which are meant to be exemplary and not limiting, and in which like references are intended to refer to like or corresponding things.

DETAILED DESCRIPTION OF THE EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The use of the terms "a," "an," "at least one," "one or more," and similar terms indicate one of a feature or element as well as more than one of a feature. The use of the term "the" to refer to the feature does not imply only one of the feature and element.

When an ordinal number (such as "first," "second," "third," and so on) is used as an adjective before a term, that ordinal number is used (unless expressly or clearly specified otherwise) merely to indicate a particular feature, such as to distinguish that particular feature from another feature that is described by the same term or by a similar term.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate). Similarly, where more than one device, article or other product is described herein (whether or not they cooperate), a single device/article may alternatively be used in place of the more than one device or article that is described. Accordingly, the various functionality that is described as being possessed by more than one device or article may alternatively be possessed by a single device/article.

The functionality and/or the features of a single device that is described may be alternatively embodied by one or more other devices, which are described but are not explicitly described as having such functionality/features. Thus, other embodiments need not include the described device itself, but rather can include the one or more other devices that would, in those other embodiments, have such functionality/features.

Various embodiments will now be described in detail on the basis of exemplary embodiments. Embodiments disclosed herein may be practiced using programmable digital computers and networks therefor.

Disclosed is a system that is able to deliver specialized data packets, such as metadata packets, to a target device for a particular piece of media.

Figure 1:
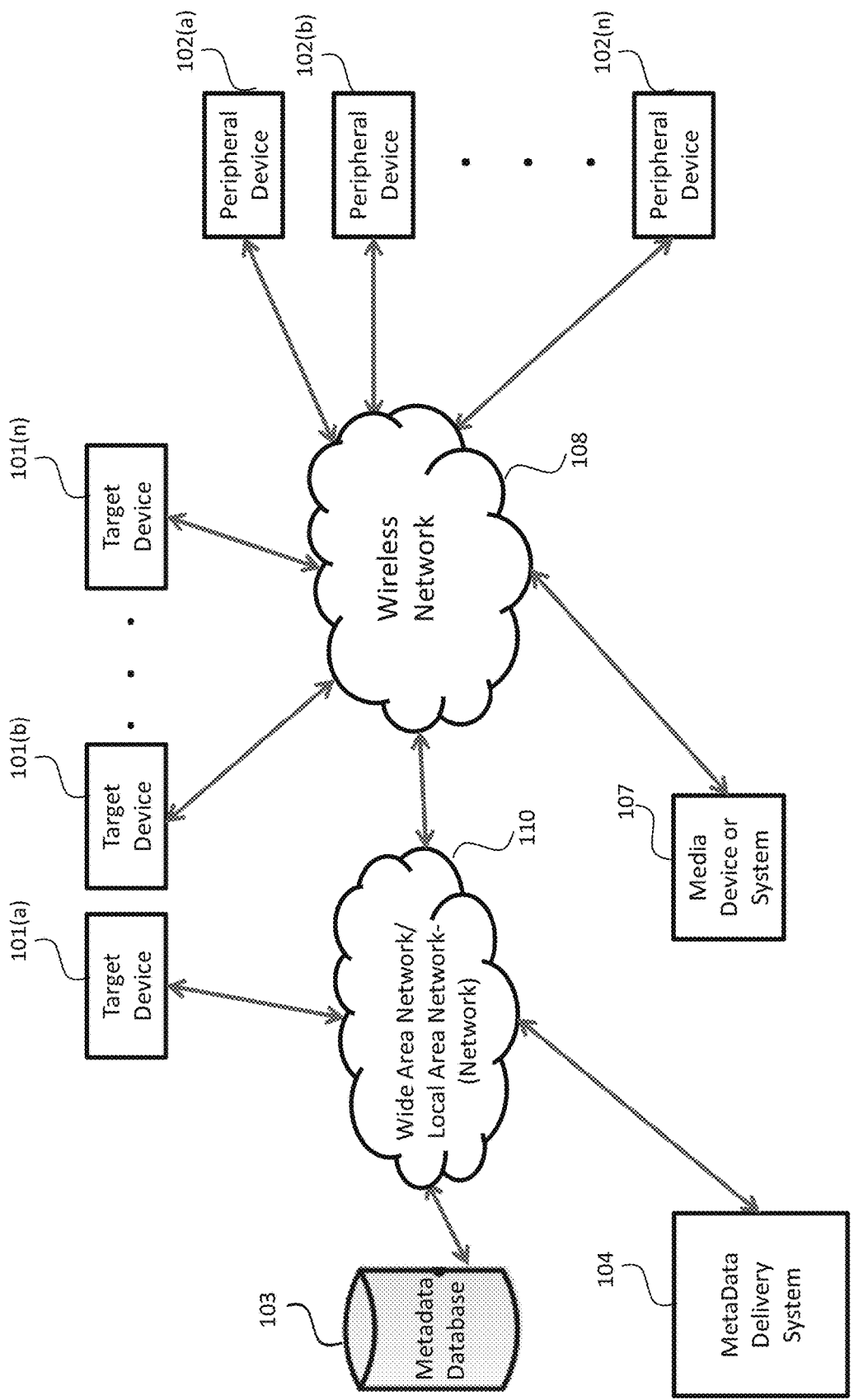
FIG. 1 is a system diagram of an environment in which at least one of the various embodiments may be implemented.

FIG. 1 shows components of one embodiment of an environment in which embodiments of the innovations described herein may be practiced. Not all of the components may be required to practice the innovations, and variations in the arrangement and type of the components may be made without departing from the spirit or scope of the innovations. As shown, system 100 of FIG. 1 includes a media device or system 107; local area networks (LANs) wide area networks (WANs)-(network) 110; wireless network 108; target devices 101(a), 101(b) . . . 101(n), which may be a tablet, a set top box or a BD/DVD player; metadata database 103; metadata delivery system 104 that delivers metadata stored in metadata database 103 to the target device 101(a), 101(b) . . . 101(n); and peripheral devices 102(a), 102(b) . . . 102(n), such as toys or secondary display device, which can be controlled remotely, for example, over a wireless network. The target device 101(a), 101(b) . . . 101(n) and the peripheral devices 102(a), 102(b) 102(n) exchange information via a discovery process during which identification data is exchanged. Exemplary metadata delivery systems are described in U.S. patent application Ser. No. 14/588,143 entitled Management, Categorization, Contextualizing and Sharing of Metadata-Based Content and U.S. application Ser. No. 14/587,926, entitled Identifying and Categorizing Contextual Data for Media, and U.S. patent application Ser. No. 14/588,224 entitled Lull Management for Content Delivery, each of which were filed on Dec. 31, 2014 concurrently herewith by the same Applicant, OpenTV, Inc., and the entirety each of which is incorporated by reference herein.

At least one embodiment of target devices 101(a)-101(n) is described in more detail below in conjunction with FIG. 18. In one embodiment, at least some of target devices 101(a)-101(n) may operate over a wired and/or wireless network, such as networks 110 and/or 108. Generally, target devices 101(a)-101(n) may include virtually any computer capable of communicating over a network to send and receive information, perform various online activities, offline actions, or the like. In various embodiments, one or more of target devices 101(a)-101(n) can be configured to operate in conjunction with a media device or system 107, for example a television, radio, another computer, a tablet device, a smart phone, or any device enabled to allow a user to consume media. For example, target devices 101(a)-101(n) can be configured to send data from a user consuming a media product on a media device or system 107, for example a movie, television show, or listening to music from or another source or media device or system, e.g.: a television, a radio, a home theater, a sound system, another computer, or even in a movie theater, etc. In various embodiments the media product may be provided to the user locally, for example via DVD, CD, or any locally or physically stored media, etc. and can also be provided by a media content delivery service, such as a streaming media service, which can be provided by the metadata delivery system 104 to the other media device (e.g. a television or another computer). Target devices 101(a)-101(n) need not of course be constrained to such use and may also be employed, for example, as an end-user computing node, or any other typical use for a computer device.

Computers that may operate as target device 101(a) may include computers that typically connect using a wired or wireless communications medium such as personal computers, multiprocessor systems, microprocessor-based or programmable electronic devices, network PCs, or the like. In some embodiments, target devices 101(a)-101(n) may include virtually any portable personal computer capable of connecting to another computing device and receiving information. However, portable computers are not so limited and may also include other portable devices such as cellular telephones, radio frequency (RF) devices, infrared (IR) devices, Personal Digital Assistants (PDAs), handheld computers, wearable computers, integrated devices combining one or more of the preceding devices, and the like. As such, target devices 101(a)-101(n) typically range widely in terms of capabilities and features. Moreover, target devices 101(a)-101(n) may access various computing applications, including a browser, or other web-based application.

A web-enabled target device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message. In one embodiment, a user of the target device may employ the browser application to perform various activities over a network (online). However, another application may also be used to perform various online activities.

Target devices 101(a)-101(n) may also include at least one other target device application that is configured to receive and/or send content between another computer. The target device application may include a capability to send and/or receive content, or the like. The target device application may further provide information that identifies itself, including a type, capability, name, and the like. In one embodiment, target devices 101(a)-101(n) may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other target devices, metadata delivery system 104, or other computers.

Target devices 101(a)-101(n) may further be configured to include a target device application that enables an end-user to log into an end-user account that may be managed by another computer, such as metadata delivery system 104, or the like. Such end-user account, in one non-limiting example, may be configured to enable the end-user to manage one or more online activities, including in one non-limiting example, search activities, social networking activities, browse various websites, communicate with other users, or the like. However, participation in such online activities may also be performed without logging into the end-user account.

Wireless network 108 is configured to couple target devices 101(b)-101(n) and its components with network 110. Wireless network 108 may include any of a variety of wireless sub-networks that may further overlay stand-alone ad-hoc networks, and the like, to provide an infrastructure-oriented connection for target devices 101(b)-101(n). Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, LTE, 4G, 5G, and future access networks may enable wide area coverage for mobile devices, such as target devices 101(b)-101(n) with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between target devices 101(*b*)-101(*n*) and another computer, network, and the like.

Network 110 is configured to couple network computers with other computers and/or computing devices, including, metadata delivery system 104, target device 101(*a*), and target devices 101(*b*)-101(*n*) through wireless network 108. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP). In essence, network 110 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of a metadata delivery system 104 is described in more detail below in conjunctions with FIG. 19. Briefly, however, metadata delivery system 104 includes virtually any network computer capable of delivering metadata-based content to a client user and accepting requests and data therefrom. For example, target devices 101(*a*)-101(*n*) can be configured to send data from a user consuming a media product, for example a movie, television show, or listening to music from or another source or media device, e.g.: a television, a radio, a, movie theater, etc. The metadata delivery system 104 can then deliver, inter alia, complementary synchronous metadata-based content based on the identification of the media being consumed by the user. Computers that may be arranged to operate as metadata delivery system 104 include various network computers, including, but not limited to multiprocessor systems, server computers, and the like.

Although the metadata delivery system 104 may be a single computer, the invention is not so limited. For example, one or more functions of the metadata delivery system 104 may be distributed across one or more distinct network computers. Moreover, metadata delivery system 104 is not limited to a particular configuration. Thus, in one embodiment, metadata delivery system 104 may contain a plurality of network computers. In another embodiment, metadata delivery system 104 may contain a plurality of network computers that operate using a master/slave approach, where one of the plurality of network computers of metadata delivery system 104 is operative to manage and/or otherwise coordinate operations of the other network computers. In other embodiments, the metadata delivery system 104 may operate as a plurality of network computers arranged in a cluster architecture, a peer-to-peer architecture, and/or even within a cloud architecture. Thus, embodiments are not to be construed as being limited to a single environment, and other configurations, and architectures are also envisaged.

Although illustrated separately, metadata database 103 and metadata delivery system 104 may be employed as a single network computer, separate network computers, a cluster of network computers, or the like. In some embodiments, either metadata database 103 or metadata delivery system 104, or both, may be enabled to deliver content, respond to user interactions with the content, track user interaction with the content, update widgets and widgets controllers, or the like.

Figure 18:
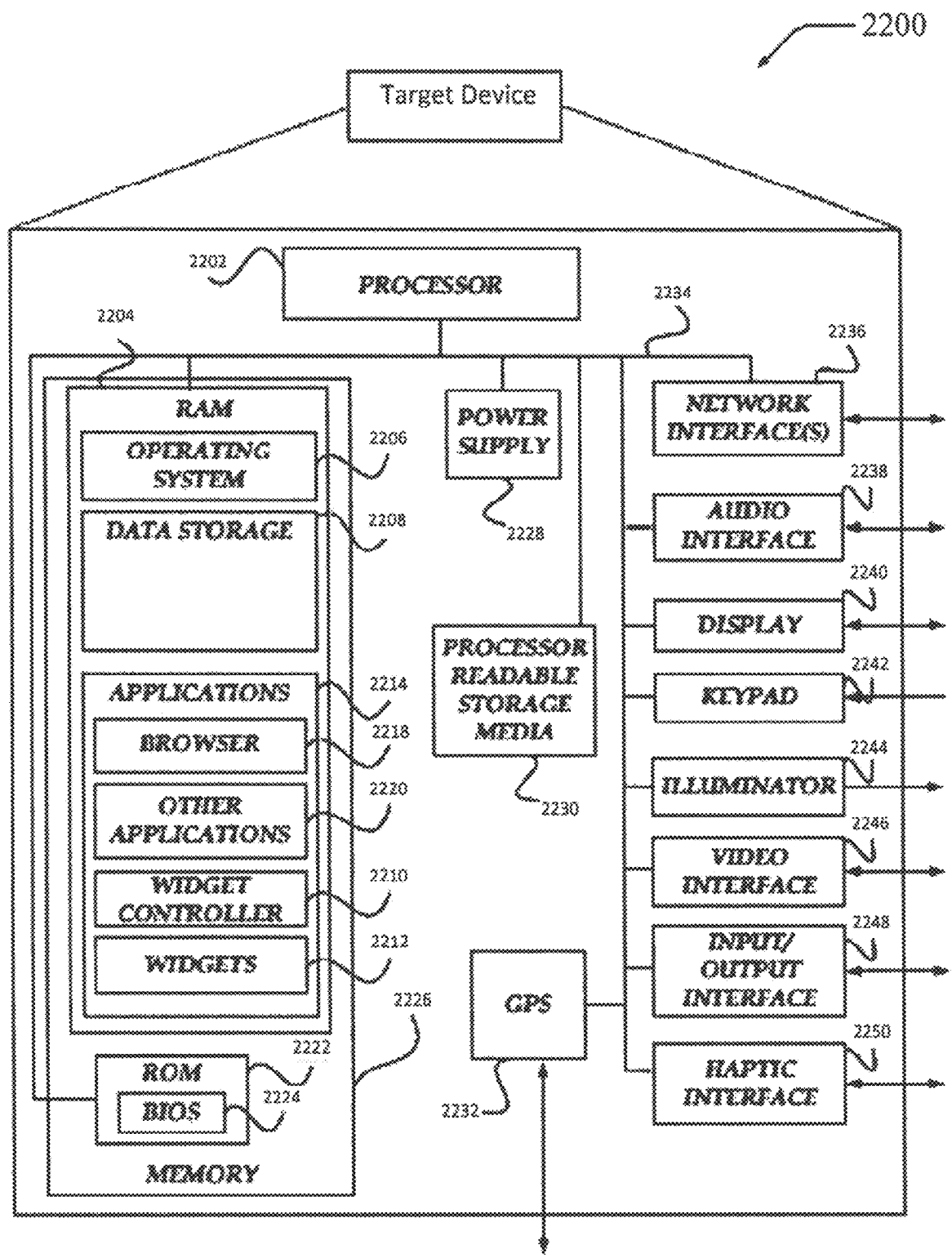
FIG. 18 shows an embodiment of a target device that may be included in a system such as that shown in FIG. 1.

FIG. 18 shows one embodiment of Target Device 2200 that may be included in a system implementing embodiments of the invention. Target Device 2200 may include many more or less components than those shown in FIG. 18. However, the components shown are sufficient to disclose an illustrative embodiment for practicing the present invention. Target Device 2200 may represent, for example, one embodiment of at least one of Target Device 2200 101(*a*)-101(*n*) of FIG. 1.

As shown in FIG. 18, Target Device 2200 includes a processor 2202 in communication with a mass memory 2226 via a bus 2234. In some embodiments, processor 2202 may include one or more central processing units (CPU). Target Device 2200 also includes a power supply 2228, one or more network interfaces 2236, an audio interface 2238, a display 2240, a keypad 2242, an illuminator 2244, a video interface 2246, an input/output interface 2248, a haptic interface 2250, and a global positioning system (GPS) receiver 2232 or other geolocation components, Power supply 2228 provides power to Target Device 2200. A rechargeable or non-rechargeable battery may be used to provide power. The power may also be provided by an external power source, such as an alternating current (AC) adapter or a powered docking cradle that supplements and/or recharges a battery.

Target Device 2200 may optionally communicate with a base station (not shown), or directly with another computer. Network interface 2236 includes circuitry for coupling Target Device 2200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/ real-time transport protocol (SIP/RTP), or any of a variety of other wireless communication protocols. Network interface 2236 is sometimes known as a transceiver, transceiving device, or network interface card (NIC).

Audio interface 2238 is arranged to produce and receive audio signals such as the sound of media from another source (e.g., television, radio, etc.). For example, audio interface 2238 may be coupled to a speaker and microphone (not shown) to enable telecommunication with others and/or generate an audio acknowledgement for some action.

Display 2240 may be a liquid crystal display (LCD), gas plasma, light emitting diode (LED), organic LED, or any other type of display used with a computer. Display 2240 may also include a touch sensitive screen arranged to receive input from an object such as a stylus or a digit from a human hand.

Keypad 2242 may comprise any input device arranged to receive input from a user. For example, keypad 2242 may include a push button numeric dial, or a keyboard. Keypad 2242 may also include command buttons that are associated with selecting and sending images.

Illuminator 2244 may provide a status indication and/or provide light. Illuminator 2244 may remain active for specific periods of time or in response to events. For example, when illuminator 2244 is active, it may backlight the buttons on keypad 2242 and stay on while the Target Device is powered. Also, illuminator 2244 may backlight these buttons in various patterns when particular actions are performed, such as dialing another target device. Illuminator 2244 may also cause light sources positioned within a transparent or translucent case of the target device to illuminate in response to actions.

Video interface 2246 is arranged to capture video images, such as a still photo, a video segment, an infrared video, or the like. For example, video interface 2246 may be coupled to a digital video camera, a web-camera, or the like. Video interface 2246 may comprise a lens, an image sensor, and other electronics. Image sensors may include a complementary metal-oxide-semiconductor (CMOS) integrated circuit, charge-coupled device (CCD), or any other integrated circuit for sensing light.

Target Device 2200 also comprises input/output interface 2248 for communicating with external devices, such as a headset, or other input or output devices not shown in FIG. 18. Input/output interface 2248 can utilize one or more communication technologies, such as USB, infrared, Bluetooth™, or the like.

Haptic interface 2250 is arranged to provide tactile feedback to a user of the target device. For example, the haptic interface 2250 may be employed to vibrate target device 2200 in a particular way when another user of a computing computer is calling. Accelerometers and other kinetic or force-based interfaces can be included as well.

Target device 2200 may also include GPS transceiver 2232 to determine the physical coordinates of target device 2200 on the surface of the Earth. GPS transceiver 2232, in some embodiments, may be optional. GPS transceiver 2232 typically outputs a location as latitude and longitude values. However, GPS transceiver 2232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of target device 2200 on the surface of the Earth. It is understood that under different conditions, GPS transceiver 2232 can determine a physical location within millimeters for target device 2200; and in other cases, the determined physical location may be less precise, such as within a meter or significantly greater distances. In one embodiment, however, target device 2200 may through other components, provide other information that may be employed to determine a physical location of the computer, including for example, a Media Access Control (MAC) address, IP address, or the like.

Mass memory 2226 includes a Random Access Memory (RAM) 2204, a Read-only Memory (ROM) 2222, and other storage means. Mass memory 2226 illustrates an example of computer readable storage media (devices) for storage of information such as computer readable instructions, data structures, program modules or other data. Mass memory 2226 stores a basic input/output system (BIOS) 2224 for controlling low-level operation of target device 2200. The mass memory also stores an operating system 2206 for controlling the operation of target device 2200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™ or the Symbian® operating system. The operating system may include, or interface with a Java virtual machine module that enables control of hardware components and/or operating system operations via Java application programs.

Mass memory 2226 further includes one or more data storage 2208, which can be utilized by target device 2200 to store, among other things, applications 2214 and/or other data. For example, data storage 2208 may also be employed to store information that describes various capabilities of target device 2200. The information may then be provided to another computer based on any of a variety of events, including being sent as part of a header during a communication, sent upon request, or the like. Data storage 2208 may also be employed to store social networking information including address books, buddy lists, aliases, user profile information, or the like. Further, data storage 2208 may also store message, web page content, or any of a variety of user generated content. At least a portion of the information may also be stored on another component of target device 2200, including, but not limited to processor readable storage media 2230, a disk drive or other computer readable storage devices (not shown) within target device 2200.

Processor readable storage media 2230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 2230 may also be referred to herein as computer readable storage media and/or computer readable storage device.

Applications 2214 may include computer executable instructions which, when executed by target device 2200, transmit, receive, and/or otherwise process network data.

Network data may include, but is not limited to, messages (e.g. SMS, Multimedia Message Service (MMS), instant message (IM), email, and/or other messages), audio, video, and enable telecommunication with another user of another client computer. Applications 2214 may include, for example, browser 2218, and other applications 2220 including those described with respect to FIG. 9. Other applications 2220 may also include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Browser 2218 may include virtually any application configured to receive and display graphics, text, multimedia, messages, and the like, employing virtually any web based language. In one embodiment, the browser application is enabled to employ HDML, WML, WMLScript, JavaScript, HTML, XML, and the like, to display and send a message. However, any of a variety of other web-based programming languages may be employed. In one embodiment, browser 2218 may enable a user of target device 2200 to communicate with another network computer, such as Metadata Delivery System 104 of FIG. 1.

Applications 2214 may also include Widget Controller 2210 and one or more Widgets 2212. Widgets 2212 may be collections of content provided to the target device by Metadata Delivery System 104. Widget Controller 2210 may be a program that may be provided to the target device by Metadata Delivery System 104. Widget Controller 2210 and Widgets 2212 may run as native target device applications or they may run in Browser 2218 as web browser based applications. Also, Widget Controller 2210 and Widgets 2212 may be arranged to run as native applications or web browser applications, or combination thereof.

As used herein, the term "widget controller" refers to a computer program that may be operative on a client application. Widget controllers may be downloaded and/or otherwise deployed to a client application. Widget controllers may be arranged to be operative for downloading content, monitoring media, or otherwise managing widgets located within client applications.

As used herein, the term "widget" refers to a user-interface element located in the client application. Widgets may be invisible or visible to users of the client applications. In some cases, a widget controller may generate widget "on-the-fly" before deploying content into the widget. Widgets may be adapted to reflect the operating environment of the client application that they are being hosted within. For example, in clients that support HTML, CSS a widget may be an HTML element such as a DIV, P, or the like. For client application operative in a Java environment, a widget may be a View object or Window object, and so on.

Figure 19:
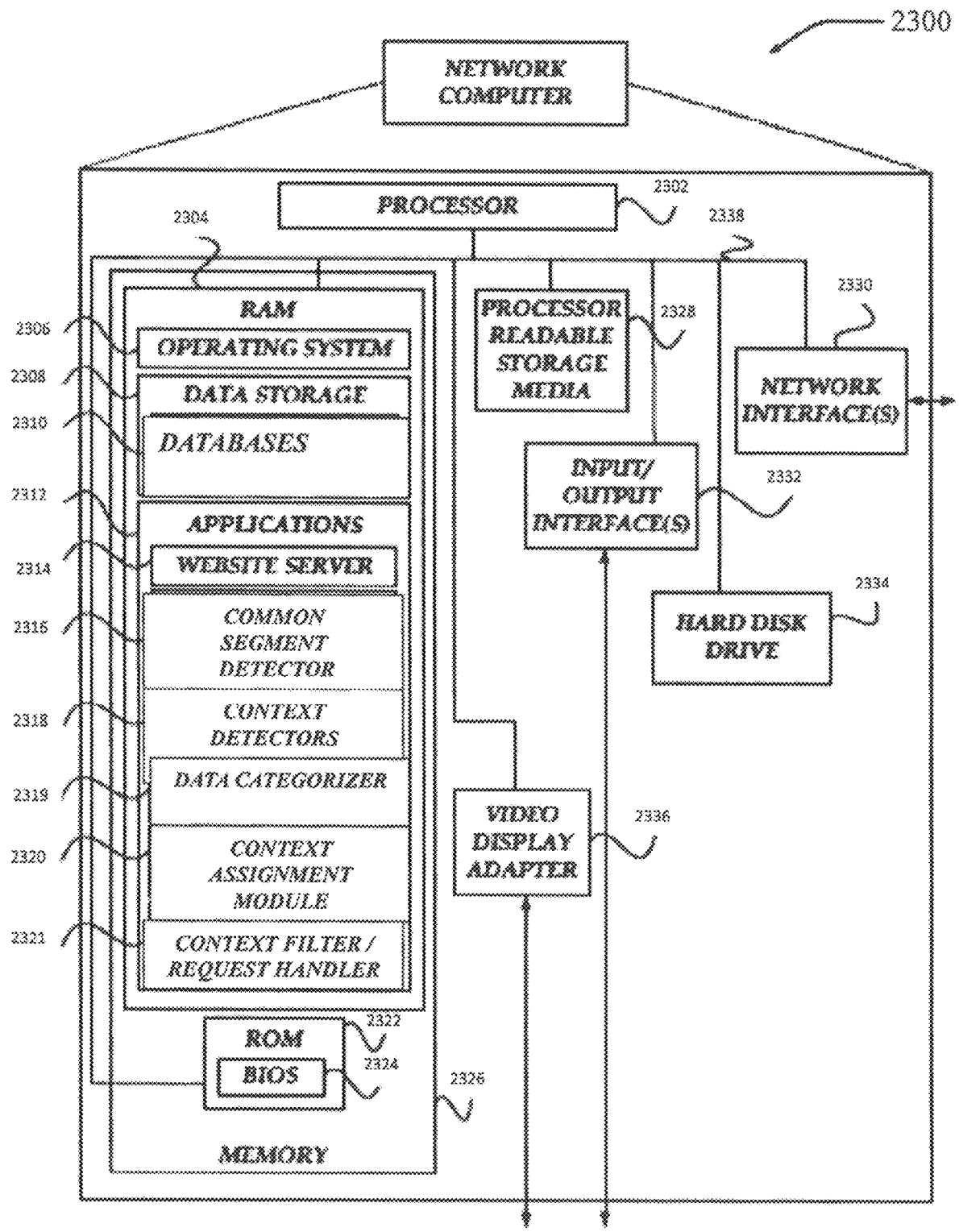
FIG. 19 shows an embodiment of a network computer that may be included in a system such as that shown in FIG. 1.

FIG. 19 shows one embodiment of a network computer 2300, according to one embodiment of the invention. Network computer 2300 may include many more or less components than those shown. The components shown, however, are sufficient to disclose an illustrative embodiment for practicing the invention. Network computer 2300 may be configured to operate as a server, client, peer, a host, or any other computer. Network computer 2300 may represent, for example Metadata Delivery System 104 of FIG. 1, and/or other network computers.

Network computer 2300 includes processor 2302, processor readable storage media 2328, network interface unit 2330, an input/output interface 2332, hard disk drive 2334, video display adapter 2336, and memory 2326, all in communication with each other via bus 2338. In some embodiments, processor 2302 may include one or more central processing units.

As illustrated in FIG. 19, network computer 2300 also can communicate with the Internet, or some other communications network, via network interface unit 2330, which is constructed for use with various communication protocols including the TCP/IP protocol. Network interface unit 2330 is sometimes known as a transceiver, transceiving device, or network interface card (NIC).

Network computer 2300 also comprises input/output interface 2332 for communicating with external devices, such as a keyboard, or other input or output devices not shown in FIG. 19. Input/output interface 2332 can utilize one or more communication technologies, such as USB, infrared, Bluetooth™, or the like.

Memory 2326 generally includes RAM 2304, ROM 2322 and one or more permanent mass storage devices, such as hard disk drive 2334, tape drive, optical drive, and/or floppy disk drive. Memory 2326 stores operating system 2306 for controlling the operation of network computer 2300. Any general-purpose operating system may be employed. Basic input/output system (BIOS) 2324 is also provided for controlling the low-level operation of network computer 2300.

Although illustrated separately, memory 2326 may include processor readable storage media 2328. Processor readable storage media 2328 may be referred to and/or include computer readable media, computer readable storage media, and/or processor readable storage device. Processor readable storage media 2328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 2326 further includes one or more data storage 2308, which can be utilized by network computer 2300 to store, among other things, applications 2314 and/or other data such as content 2310. For example, data storage 2308 may also be employed to store information that describes various capabilities of network computer 2300. The information may then be provided to another computer based on any of a variety of events, including being sent as part of a header during a communication, sent upon request, or the like. Data storage 2308 may also be employed to store messages, web page content, or the like. At least a portion of the information may also be stored on another component of network computer 2300, including, but not limited to processor readable storage media 2328, hard disk drive 2334, or other computer readable storage medias (not shown) within network compute 2300.

Data storage 2308 may include a database, text, spreadsheet, folder, file, or the like, that may be configured to maintain and store user account identifiers, user profiles, email addresses, IM addresses, and/or other network addresses; or the like.

Figure 20:
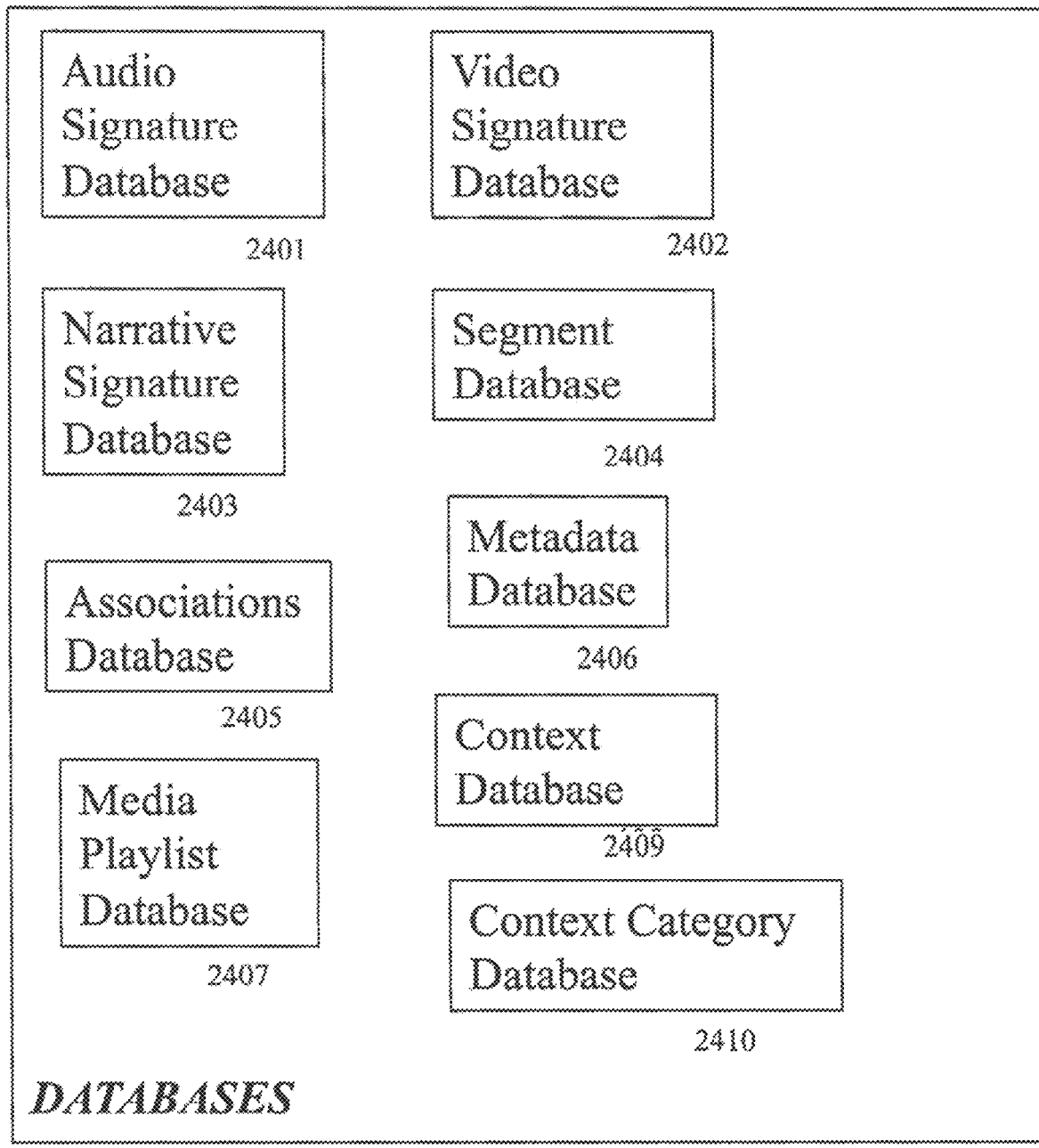
FIG. 20 illustrates a plurality of databases that may be included in a system such as that shown in FIG. 1.

In at least one of the various embodiments, data storage 2308 may include databases 2310. In various embodiments, as shown in FIG. 20, databases include such as one or more signature databases (e.g. an audio signature database 2401, a video signature database 2402, a narrative signature database 2403), a segment database 2404, an associations database 2405, a metadata database 2406, a media playlist database 2407, a context database 2409, and a context category database 2410. Although the system shows the databases 2310 as included in the system and server 2300, one or more of the databases can be external to the server or system and operatively connected thereto.

Returning to FIG. 19, data storage 2308 may further include program code, data, algorithms, and the like, for use by a processor, such as processor 2302 to execute and perform actions. In one embodiment, at least some of data store 2308 might also be stored on another component of network computer 2300, including, but not limited to processor-readable storage media 2328, hard disk drive 2334, or the like.

Applications 2312 may include computer executable instructions, which may be loaded into mass memory and run on operating system 2306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 2312 may also include, for example, a website server 2314, a Common Segment Detector Application 2316, one or more Context Difference Detector Applications 2318, a Data Categorizer Application 2319, a Context Assignment Module 2320, and/or Context Filtering and Request Handler 2321.

Website server 2314 may represents any of a variety of information and services that are configured to provide content, including messages, over a network to another computer. Thus, website server 2314 can include, for example, a web server, a File Transfer Protocol (FTP) server, a database server, a content server, or the like. Website server 2314 may provide the content including messages over the network using any of a variety of formats including, but not limited to HTML, XML, Compact HTML (cHTML), Extensible HTML (xHTML), or the like.

In at least one of the various embodiments, Applications 2312 may be operative on Metadata Delivery System 104 of FIG. 1. Applications 2312 may employ processes, or parts of processes, similar to those described in conjunction with FIGS. 2-17, to perform at least some of its actions.

Figure 2:
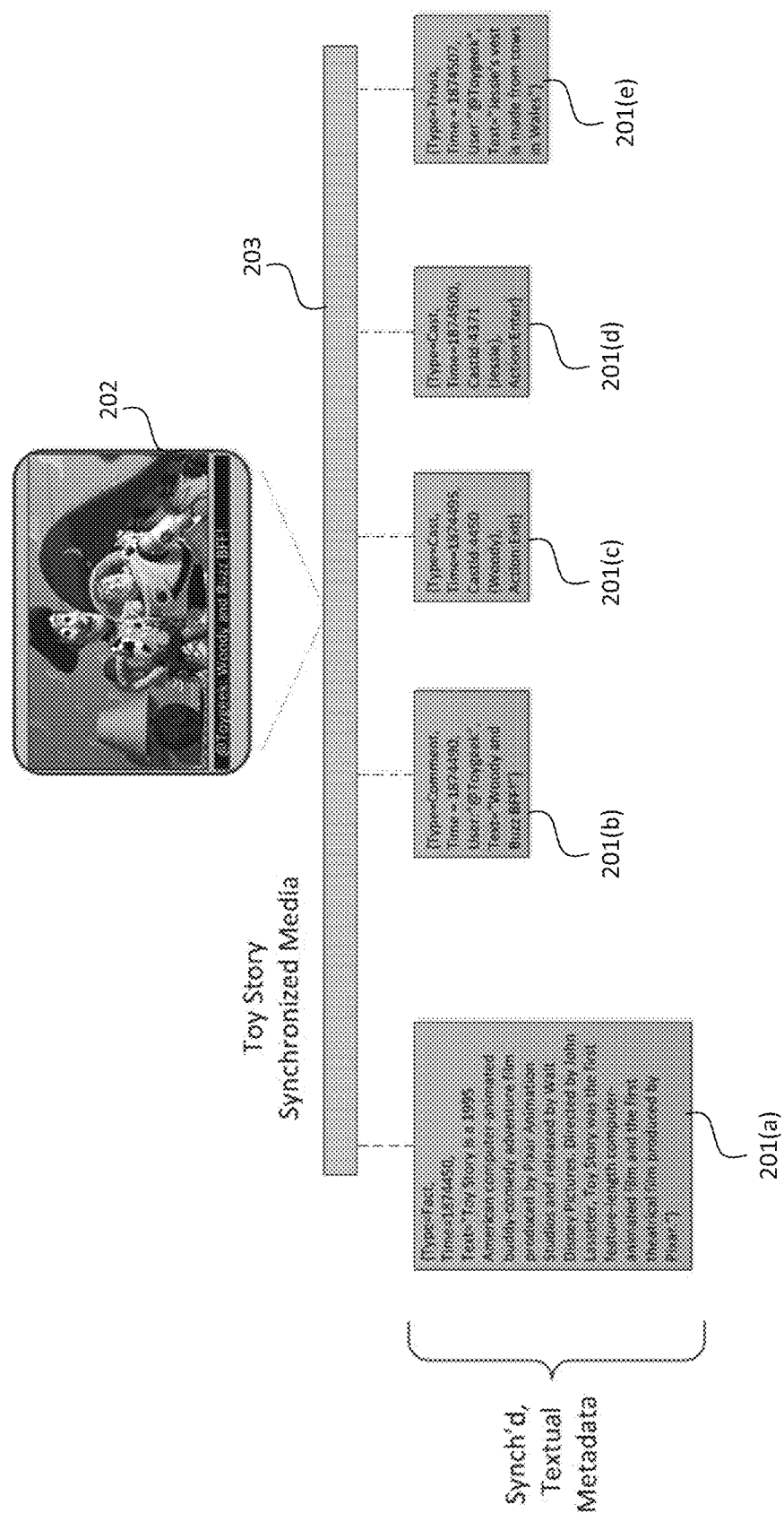
FIG. 2 depicts exemplary representations for baseline synchronized metadata.

FIG. 2 depicts an example of representations for baseline synchronized metadata. As shown in FIG. 2, the synchronized textual metadata 201(*a*), 201(*b*) . . . 201(*n*) contains precise timing information related to the A/V stream timeline 203 of media 202 being played back, which results in that the target device is able to synchronize the rendering of the metadata to the playback. For example, when the media 202 is movie Toy Story, the synchronized textual metadata 201(*a*) indicates that the type of metadata 201(*a*) is fact, and at time point "1874450" text "Toy Story is a 1995 American computer-animated buddy-comedy adventure film produced by Pixar Animation Studios and released by Walt Disney Pictures. Directed by John Lasseter, Toy Story was the first feature-length computer-animated film and the first theatrical film produced by Pixar" will be displayed on the screen associated with the target device.

Figure 3:
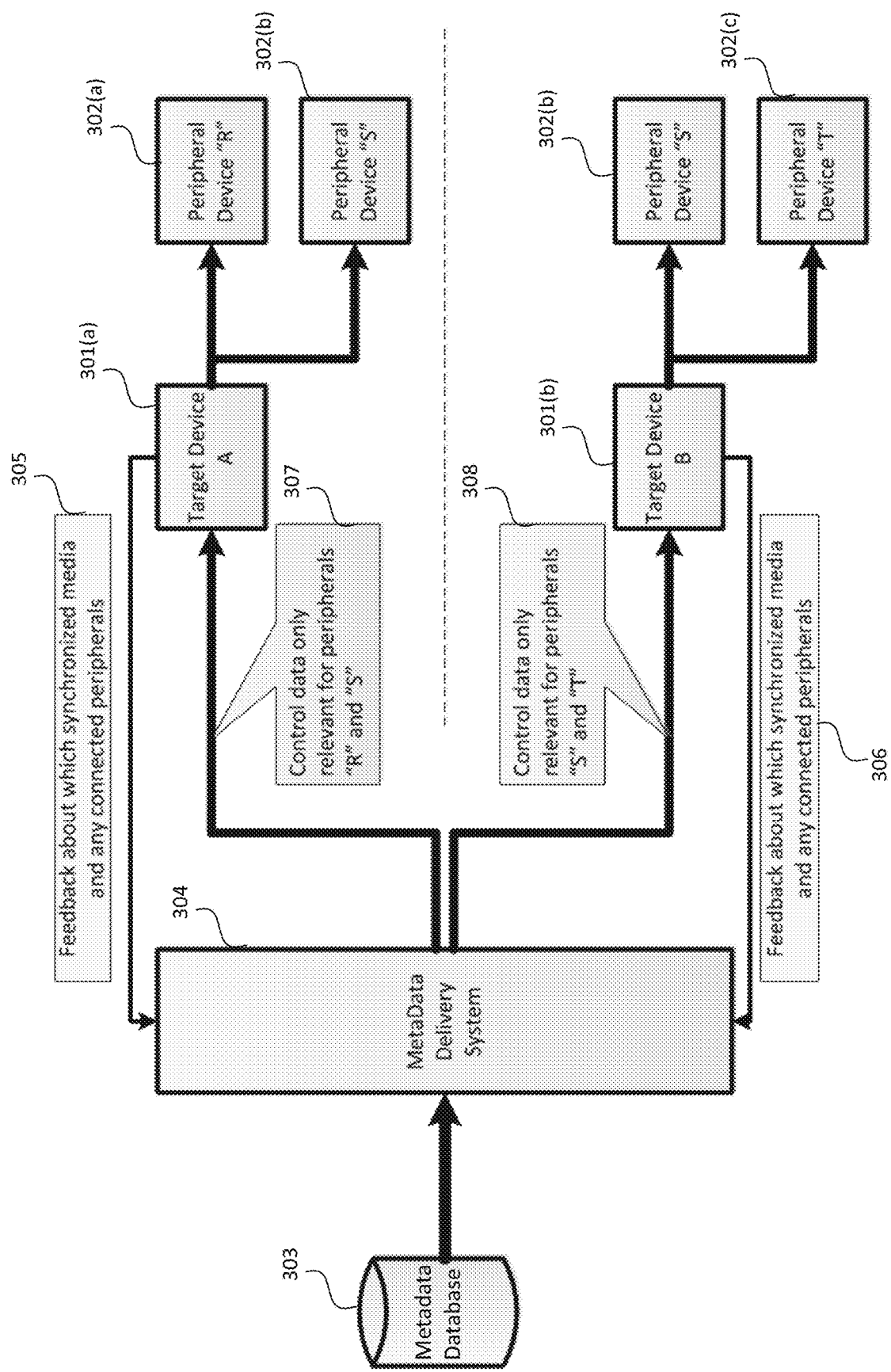
FIG. 3 shows an exemplary flow showing binary control data targeted based on peripherals.

FIG. 3 shows an exemplary flow showing binary control data targeted based on peripherals. As shown in FIG. 3, target devices 301(*a*) and 301(*b*) are connected to peripheral devices 302(*a*), 302(*b*), 302(*c*), and 302(*d*), respectively. Each type of peripheral device has its own set of control commands that are unique for that type of peripheral. Sequences of control commands, which can have very precise timing, are configured to control the peripheral (e.g., toy) to perform different functions.

As shown in FIG. 3, metadata database 303 provides metadata to the metadata delivery system 304. Target device 301(*a*) communicates the peripheral identification information 305, which is data about the connected peripheral devices 302(*a*) and 302(*b*), to the metadata delivery system 304 so that the metadata delivery system 304 may send peripheral control data 307, which is only relevant for peripheral device R 302(*a*) and peripheral device S 302(*b*), to target device 301(*a*). Similarly, target device 301(*b*) communicates the peripheral identification information 306, which is data about the connected peripheral devices 302(*b*) and 302(*c*), to the metadata delivery system 304 so that the metadata delivery system 304 may send peripheral control data 308, which is only relevant for peripheral device S 302(*b*) and peripheral device T 302(*c*), to target device 301(*b*). It will be noted that a peripheral device may be connected to one or more target devices. The control commands for the peripherals are inserted into binary metadata packets and distributed to the target device using the metadata delivery system, which will be described below referring to FIG. 4.

Figure 4:
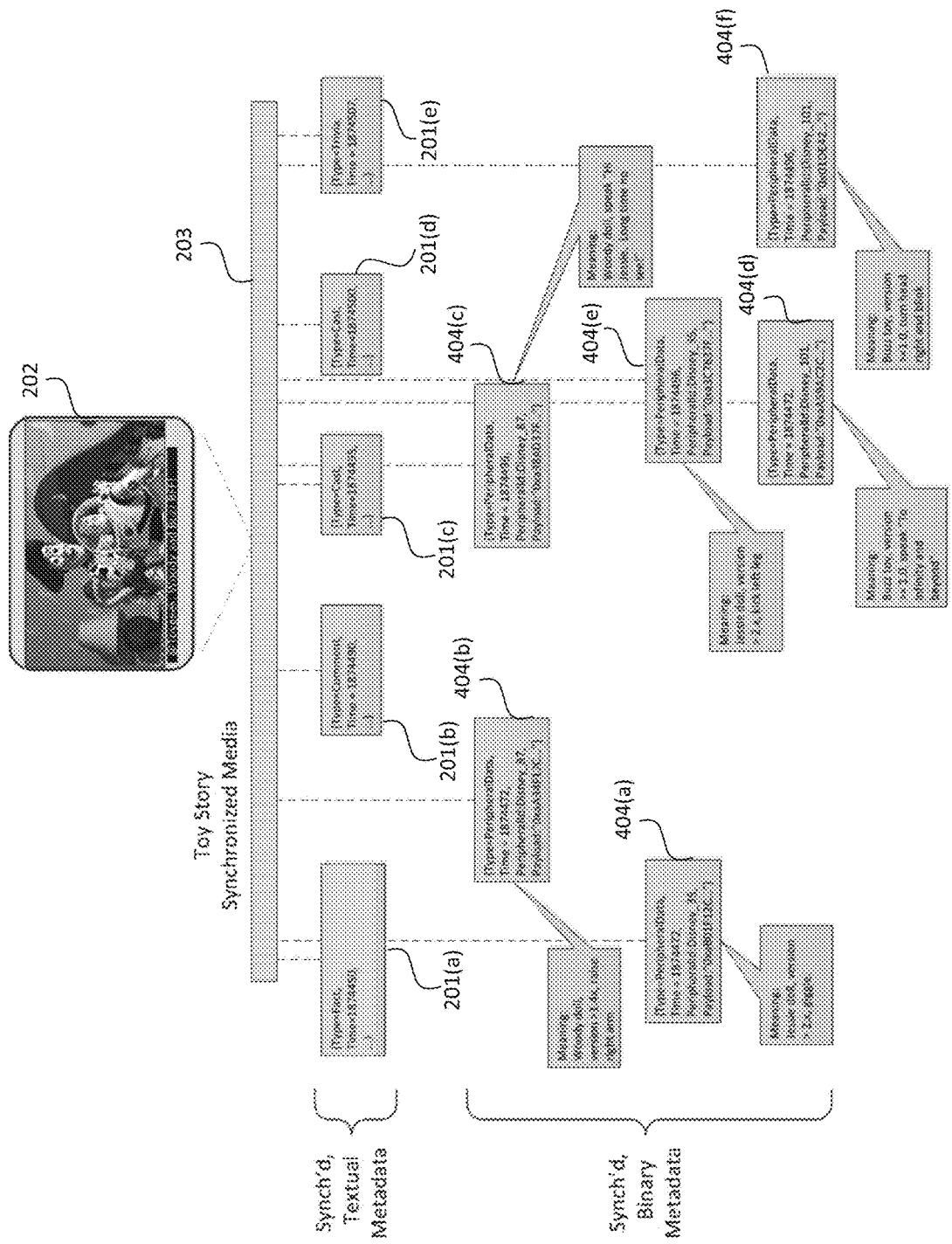
FIG. 4 depicts exemplary representations for baseline system enhanced with binary data packets intended for peripherals.

FIG. 4 depicts exemplary representations for baseline system enhanced with binary data packets intended for peripherals. As shown in FIG. 4, in addition to the synchronized textual metadata 201(*a*)-201(*e*) that corresponds to the A/V stream timeline 203 of the media 202 which has been described in FIG. 2, synchronized binary metadata 404(*a*)-404(*f*) that corresponds to the A/V stream timeline 203 is also delivered to the target device. The binary data packets include a textual header with some peripheral specific addressing information in text format and a binary payload holding the control data for the peripheral. An example of the binary data packet 404(*a*) will be described below referring to FIG. 5.

Figure 5:
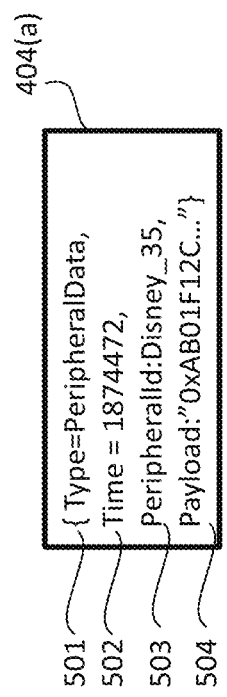
FIG. 5 illustrates an example of metadata packet intended for a peripheral device.

FIG. 5 illustrates an example of metadata packet intended for a peripheral device. In the metadata packet 404(*a*), type 501 "PeripheralData" indicates that metadata packet 404(*a*) is intended for a peripheral device. Time 502 indicates the time point, for example, 1874472, at which the intended peripheral device should perform a particular action designated by the metadata packet 404(*a*). Peripheral ID 503 indicates that metadata packet 404(*a*) is intended for a particular peripheral device with ID "Disney_35". Payload 504 indicates the action indicated by "0xAB01F12C . . . " to be performed by the particular peripheral device.

Referring back to FIG. 4, for example, synchronized binary metadata 404(*a*) includes information that means that the peripheral device "Jessie doll" with version higher than 2.× should perform action "giggle" at time point 1874472. Similarly, metadata 404(*b*) means that the peripheral device "Woody doll" with version higher than 1.4× should perform action "raise right arm" at time point 1874472; metadata 404(*c*) means that the peripheral device "Woody doll" should speak "Hi Jessie. Long time no see" at time point 1874496; metadata 404(*d*) means that the peripheral device "Buzz toy" with version no lower than 1.0 should speak "To infinity and beyond" at time point 1874472; metadata 404(*e*) means that the peripheral device "Jessie doll" with version higher than 2.× should perform action "kick left leg" at time point 1874496; and metadata 404(*f*) means that the peripheral device "Buzz toy" with version no lower than 1.0 should perform action "turn head right and blink" at time point 1874496.

Figure 6:
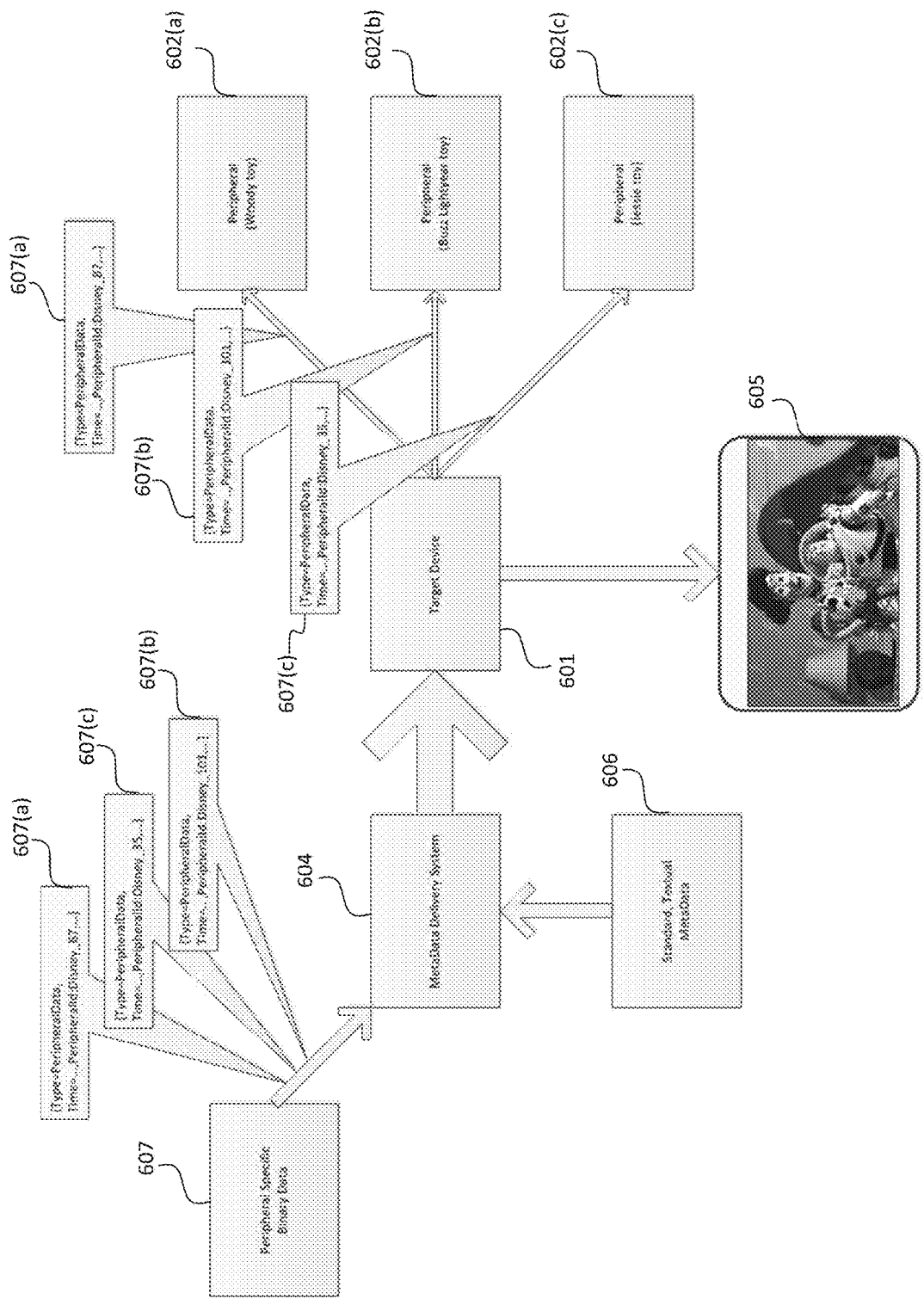
FIG. 6 depicts an overall architecture and the data flow of the metadata delivery system.

FIG. 6 depicts an exemplary embodiment of an overall architecture and data flow of the metadata delivery system. As shown in FIG. 6, metadata delivery system 604 delivers standard textual metadata 606 and peripheral specific binary data 607 to the target device 601. The peripheral specific binary data 607 includes binary metadata 607(*a*)-607(*c*), which is intended to peripheral devices 602(*a*)-602(*c*), respectively. The target device 601 distributes the binary metadata 607(*a*)-607(*c*) to the corresponding peripheral devices 602(*a*)-602(*c*), which will perform actions according to the distributed metadata.

As shown in FIG. 6, the target device typically renders the delivered metadata on its associated screen 605, e.g. a TV for a set top box. In the case of binary data packets meant for a peripheral, the packet data may not be rendered, but instead broadcast to the appropriate peripheral via a wireless network to which both the target device and peripherals are connected.

In various embodiments, the sourcing of the binary data packets meant for the peripherals is external to the metadata delivery system and the packets can be sourced in a just-in-time fashion before being delivered to the target device. This type of external sourcing allows for real-time changes to the peripheral control data, e.g. to fix bugs or to modify the behavior of the peripheral, e.g. the toy, by the peripheral maker. One exemplary advantage of external sourcing is that the system can be configured to avoid having peripheral control data permanently coded into a non-external video delivery stream (e.g. coded or provided in a local device or product) and hence not being changeable over time. For example, Toy Story has been distributed on DVD, BD and in streaming format. A Toy Story DVD purchased 10 years ago can be played still in any DVD player. That DVD contains no information beyond the movie itself. If Disney produced a wirelessly controllable Woody doll next year, none of the millions of existing Toy Story DVD's in circulation would be able to control the Woody doll and thus, the Woody doll would not be able to interact with the media as it is being played back.

Further, in the metadata delivery system, each piece of data delivered to the target device carries timing information relative to the media being played back. In this way the target device can buffer data and only act on the data at exactly the right time, thus achieving precise synchronization with the playback of the media.

For binary packets intended for peripherals, the packets are broadcast to a relevant, connected peripheral. In certain embodiments, distances between the target device and the peripherals are short and hence network transmission quality can be very good with negligible lag between the target device broadcast moment and the reception of the data by the peripheral. This means that the peripheral can derive its internal timing in part based on when it receives data and thus, highly precise synchronization between the peripheral and the media can be achieved even without a two-way protocol such as RTSP. If the target device loses sync with the media, this can be communicated to the peripherals. In various embodiments the target device can be configured to stop transmitting control data to the peripherals until the target device has regained synch with the media.

In various embodiments, each peripheral may communicate directly with the metadata delivery system, so that the flow of data may be managed without using a target device.

Accordingly, in various embodiments the system is configured to enable the peripheral devices to synchronize behaviors independently of the way the media item is distributed. Additionally, in various embodiments the behaviors do not have to be prebuilt into a peripheral, for example, in a toy at shipping. Thus the peripheral's behavior can change and evolve over time. Thus the peripheral can be synchronized to a more expansive and evolving media as the peripheral's behaviors can be updated or modified for each new media item.

For example, where the peripheral is a toy, the toy 'recognizes' a video sequence from a new movie related to the toy, and multiple behaviors can be supported for any particular video sequence, and not be limited to the inbuilt memory capacity of the toy; new behaviors can be introduced over time keeping the toy's behavior fresh.

In various embodiments, a peripheral can be configured to learn and add new behaviors which can then be stored in the system. For example, when the user of the toy moves the toy while watching/synchronized to a video sequence, the toy's sensors can record the movements introduced by the user. When the toy is moved by the user to perform actions of, for instance, a dance, these actions may be automatically uploaded into the system and used by other toys for that particular video sequence. A toy can learn how to dance to a particular video sequence by aggregating how the toy users' moves their toy during that sequence. The aggregation algorithm may apply methods that include averaging and smoothing the limb movements, for example, to effectively crowd source a new toy dance or movements for that video sequence.

As shown in FIG. 6, in various embodiments the peripheral devices have their own class of metadata packets, and do not generate their own response data. In other embodiments, the peripheral devices can generate their own data to be sent to other devices, such as the target device. Thus in various embodiments, there can be a class of metadata packets intended for peripheral device that generates response data, which is described below referring to FIG. 7.

Figure 7:
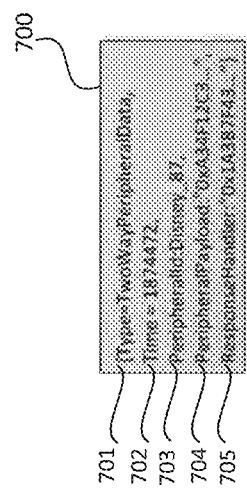
FIG. 7 illustrates another example of metadata packet intended for a peripheral device.

FIG. 7 illustrates an example of metadata packet intended for a peripheral device that is capable of generating its own response data asynchronously and sending the response data back to the target device. The target device can monitor the motions of the peripheral device by reading at the response data sent back from the peripheral device. The metadata packets include an identifier indicating the peripheral can send response data and also include a Response Handler portion, after the Peripheral Payload portion.

In the metadata packet 700, type 701 indicates that metadata packet 700 is "Two way peripheral data." Time 702 indicates the time point at which the intended peripheral device should perform a particular action designated by the metadata packet 700. Peripheral ID 703 indicates that metadata packet 700 is intended for a particular peripheral device with ID "Disney_87". Peripheral Payload 704 indicates the action to be performed by the particular peripheral device. The Response Handler 705 is a set of instructions intended for the target device, which instructs the target device how to act after the target device has sent the Peripheral Payload to the desired peripheral device. In their simplest form, these instructions are byte codes, but they can also be higher level direct action instructions that are tailored to functionality of the target device.

Figure 8:
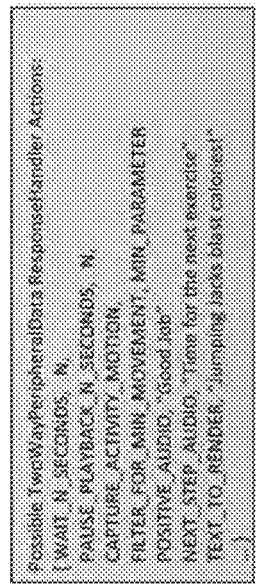
FIG. 8 illustrates an example of possible implementation of actions included in a Response Handler.

FIG. 8 illustrates an example of possible implementation of actions included in the Response Handler. As shown in FIG. 8, an action can have arguments following it. For example, the possible Two Way Peripheral Data Response Handler actions may be "wait N seconds," "pause playback N second," "capture activity motion," "filter for min movement," "positive audio, Good Job", etc.

Because the format for these actions is target device independent, a same interpreter can be used on multiple target devices, and only a recompile is required for that particular device.

Figure 9:
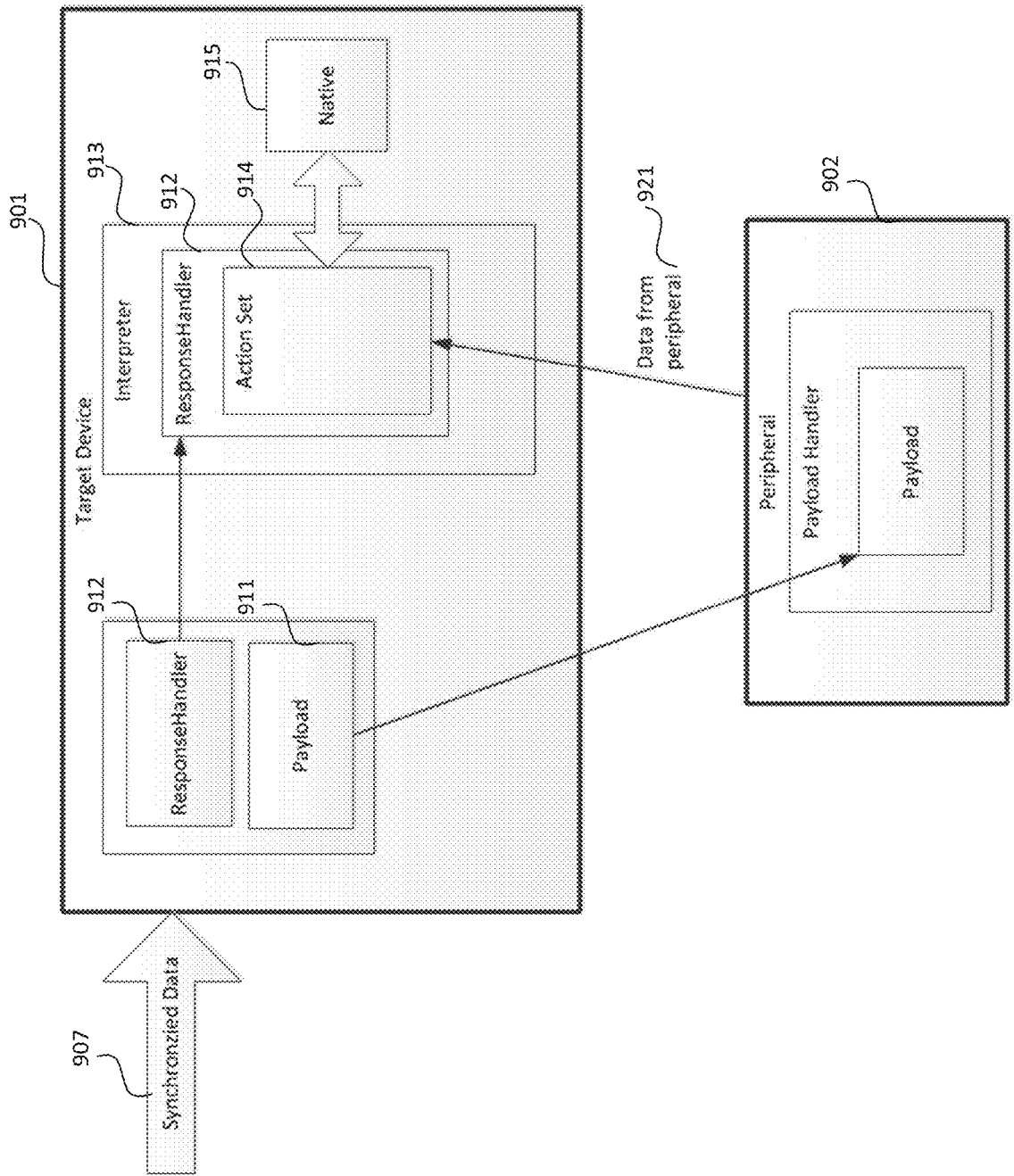
FIG. 9 depicts the data flow of a metadata delivery system comprising a peripheral device.

FIG. 9 depicts an example of the data flow of a metadata delivery system comprising a peripheral device that can generate response data. As shown in FIG. 9, after the synchronized data 907 is delivered to the target device 901, the target device 901 sends the Peripheral Payload 911 to the peripheral device 902 and passes the Response Handler 912 to the interpreter 913. The peripheral device 902 sends data 921 generated by itself back to the target device 901. These generated data 921 are used as inputs to the interpreter 913 when the actions 914 are processed. Some actions, such as play audio or pause playback, require communication with the native code 915 on the target device 901.

Figure 10:
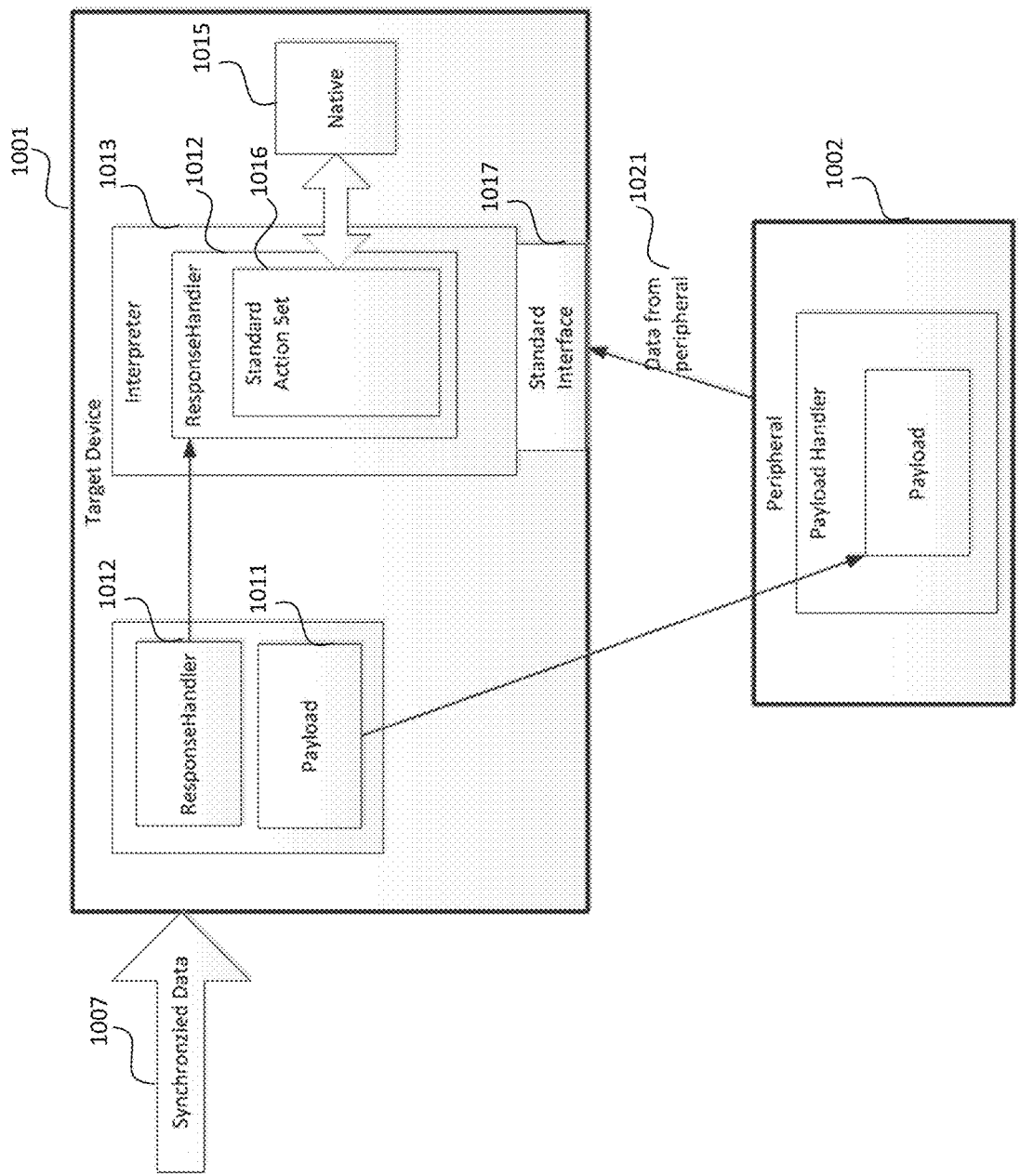
FIG. 10 depicts the data flow of a metadata delivery system defining standard interfaces for the peripheral device and Response Handler actions.

Alternatively, FIG. 10 depicts the data flow of a metadata delivery system, which defines standard interfaces for the peripheral device and Response Handler actions. As shown in FIG. 10, having a standard data interface 1017 for peripherals cuts down the chance of errors and having a standard set of actions 1016 simplifies the processing. Similar to those described above with respect to FIG. 9, after the synchronized data 1007 is delivered to the target device 1001, the target device 1001 sends the Peripheral Payload 1011 to the peripheral device 1002 and passes the Response Handler 1012 to the interpreter 1013. The peripheral device 1002 sends data 1021 generated by itself back to standard interface 1017 of the target device 1001. These generated data 1021 are used as inputs to the interpreter 1013 when the standard actions 1014 are processed. Some actions require communication with the native code 1015 on the target device 1001.

Figure 11:
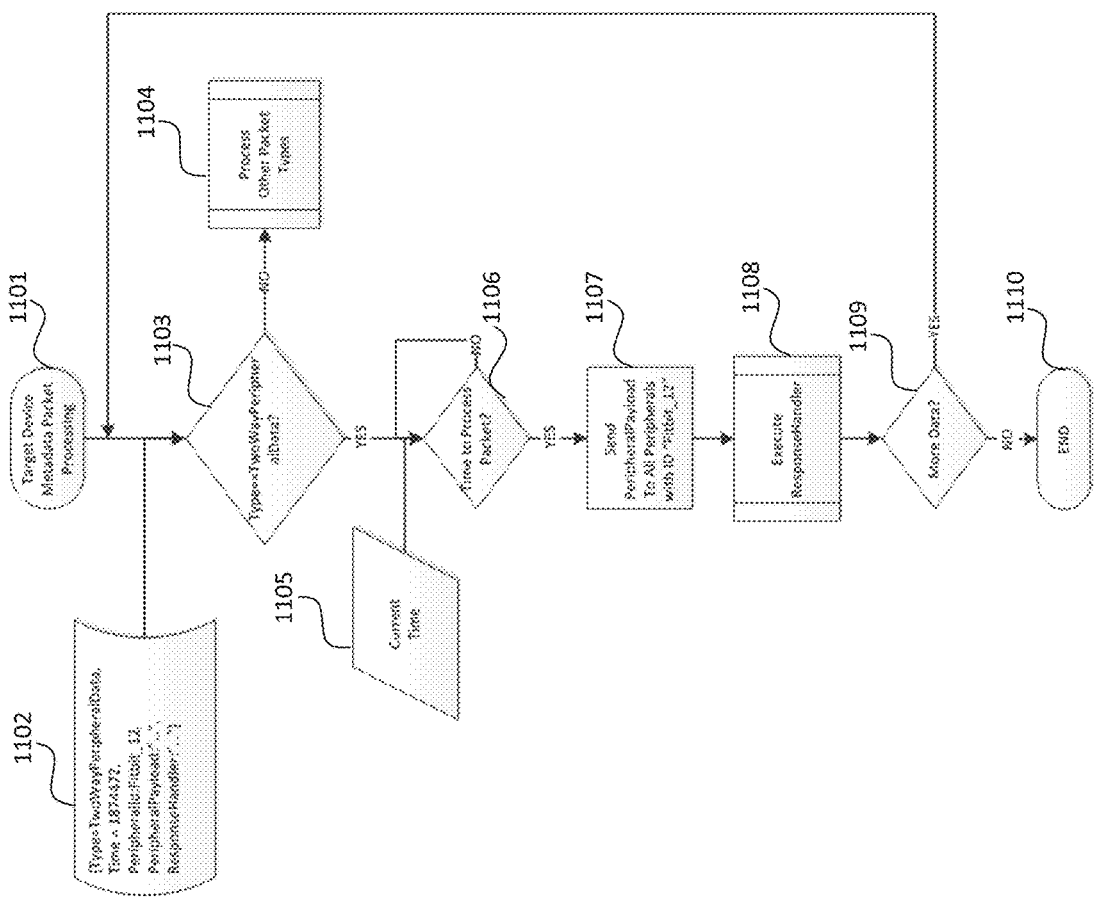
FIG. 11 shows a flow chart for processing a packet on a target device.

FIG. 11 shows a flow chart for one possible implementation of how to process a "Two Way Peripheral Data" packet on a target device. The target device starts the metadata packet processing at step 1101. The metadata delivery system sends the metadata packet 1102 to the target device. The metadata packet 1102, for example, indicates that this is a Two Way Peripheral Data type metadata which is intended to peripheral device with ID "Fitbit_12" to perform actions indicated by Peripheral Payload at time point "1874472".

After receiving the metadata packet 1102, in step 1103 a determination is made regarding whether the type of the metadata packet 1102 is Two Way Peripheral Data. If the type of the metadata packet 1102 is not Two Way Peripheral Data, the "NO" line leads to step 1104 where the target device begin to process the metadata as other types of packets. If the type of the metadata packet 1102 is determined as Two Way Peripheral Data, the "YES" line leads to step 1106 where a determination is made regarding whether it is time to process the packet based on the current time 1105. If it is determined that it is not the right time, the "NO" line leads back to step 1106 where determination is made again until the determination result is "YES", then the "YES" line leads to step 1107 where the target device sends the Peripheral Payload to all the peripheral devices with ID designated by the Two Way Peripheral Data packet, e.g., "Fitbit_12". Then the target device executes Response Handler in step 1108, which will be described in detail in FIG. 11. In step 1109, a determination is made regarding whether there is more data to be processed, and if there is more data, the "YES" line leads back to step 1103. Otherwise, the "NO" line leads to an end step 1110.

Figure 12:
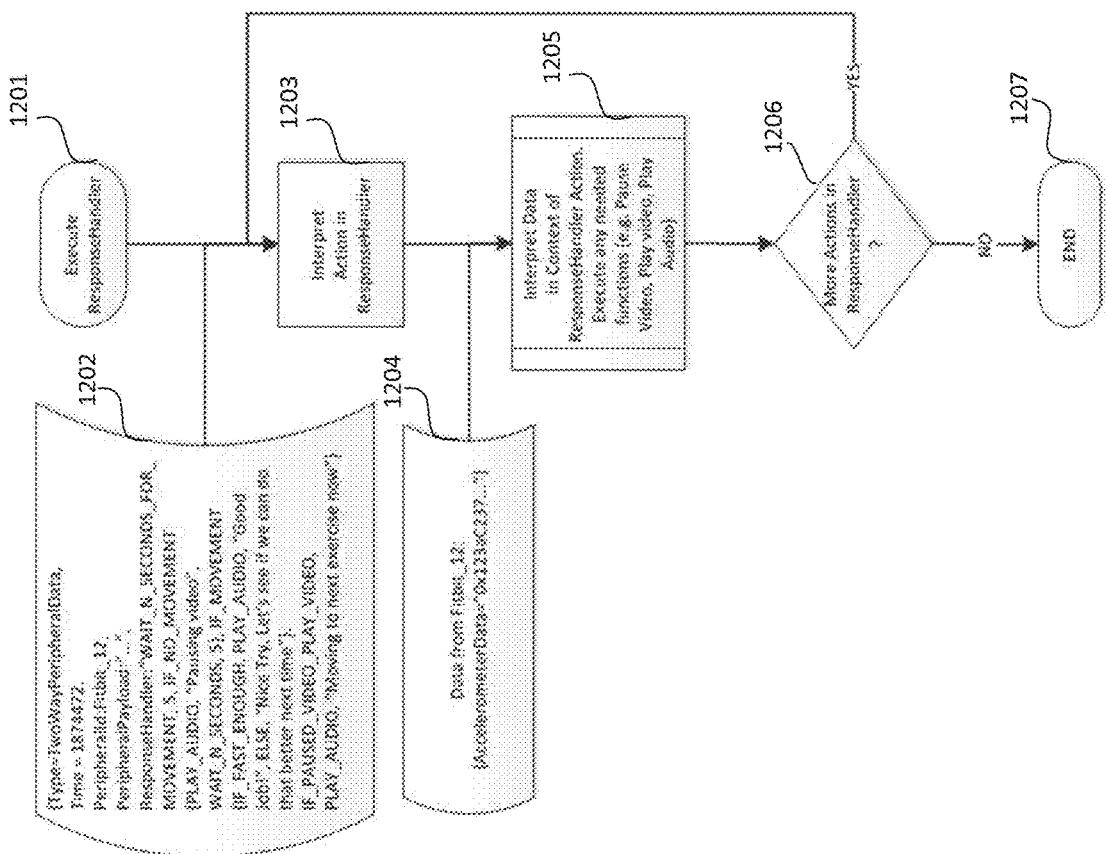
FIG. 12 shows a flow chart for executing Response Handler on the target device.

FIG. 12 shows a flow chart for one possible execution of a Response Handler on the target device. The target device starts the Response Handler executing at step 1201. For example, the metadata packet 1202 delivered to the target device indicates that this is a Two Way Peripheral Data type metadata which is intended to peripheral device with ID "Fitbit_12" to perform actions indicated by Peripheral Payload at time point "1874472", and the Response Handler indicates the actions to be performed by the target device, such as "wait N second for movement", "if no movement, play audio 'pausing video' wait N seconds", etc.

After receiving the metadata packet 1202 that includes the Response Handler, the interpreter in the target device interprets the action in the Response Handler in step 1203. After receiving data 1204 from the peripheral device with ID "Fitbit_12", e.g., AccelerometerData="0x123aC237 . . . ", in step 1205 the interpreter interprets data in context of Response Handler Action, and the target device execute the needed functions, e.g., pause video, play video, play audio, etc. In step 1206, a determination is made regarding whether there are more actions in Response Handler, and if there are more actions, the "YES" line leads back to step 1203. Otherwise, the "NO" line leads to an end step 1207. It will be noted that most Response Handler actions can be both synchronous and asynchronous.

In another embodiment, the peripheral devices or the target device may be second screen applications or companion applications, which are meant to complement media played on another screen, such as a primary screen. The peripheral device, such as the toy, may have a built-in target device. The target device and the peripheral may exist in a same physical object as well as separate, networked objects. Companion applications are running in proximity to the primary screen. Since both the primary screen and the secondary screen produce ambient light, to avoid the contrast between these different sources of ambient light that creates a distracting or unpleasant viewing environment, the metadata delivery system may create trigger events within the database using a data map, and send the trigger-points to the companion application to change the graphical user interface (GUI) of the second screen or companion application at specific moments of the media being playback.

Figure 13:
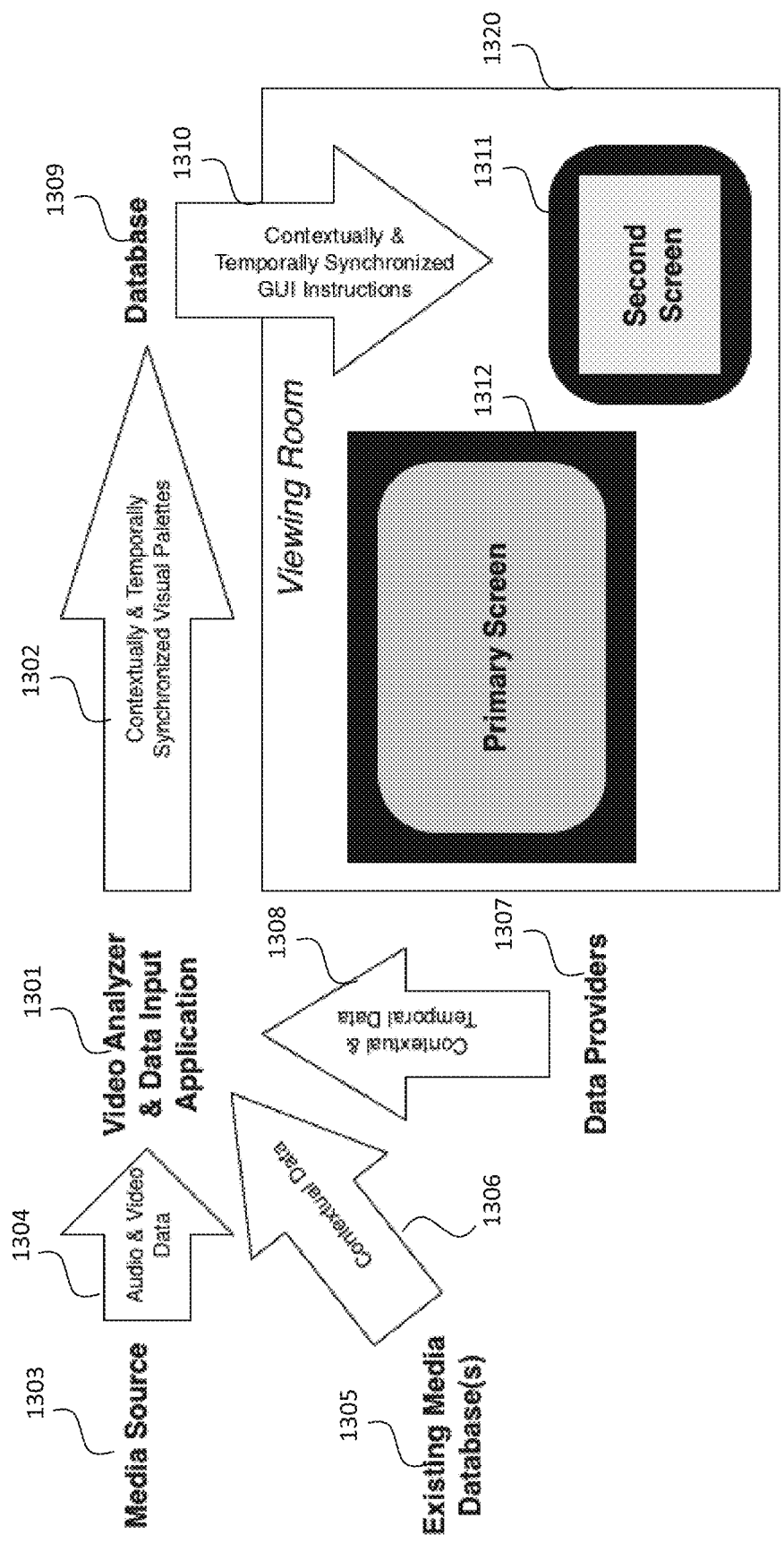
FIG. 13 depicts the data flow of a metadata delivery system that creates GUI adjustment triggers.

FIG. 13 depicts an exemplary data flow of an embodiment of a metadata delivery system that creates GUI adjustment triggers. The system can gathers information about a media title from a variety of sources and then linking this information to create an information map of the media, e.g., a film. The triggers can be generated automatically based on automated audio/video analysis or manually using the data map as a guideline to what GUI changes are most appropriate.

As shown in FIG. 13, a video analyzer and data input application 1301 gathers information from three data sources, including media source 1303 that provides audio and video stream data 1304, existing media database 1305 that provides contextual information about collections of media 1306, and data providers 1307 that provides contextual and temporal information 1308. An example of data sources that provide contextual data are described in U.S. patent application Ser. No. 14/588,143 entitled Management, Categorization, Contextualizing and Sharing of Metadata-Based Content and U.S. application Ser. No. 14/587,926, entitled Identifying and Categorizing Contextual Data for Media, and U.S. patent application Ser. No. 14/588,224 entitled Lull Management for Content Delivery, each of which were filed on Dec. 31, 2014 concurrently herewith by the same Applicant, OpenTV, Inc., and the entirety each of which is incorporated by reference herein. Further, in various embodiments manual data can be gathered from paid annotators or crowd-sourcing applications.

The resulting pool of data can be aggregated and linked through the timeline of the media and key contextual elements of the media (genre, era, etc. . . . ). The same contextual elements can also be used to link several media titles together and determine useful patterns shared by groups of film and television programs. These patterns can then be used to approximate appropriate GUI changes for an unanalyzed media title based on similar media titles. Although this data can come from a variety of sources, the data itself can be from automated analysis of a temporal A/V element, contextual data, or other temporal data, examples of each of which are described below.

Figure 14:
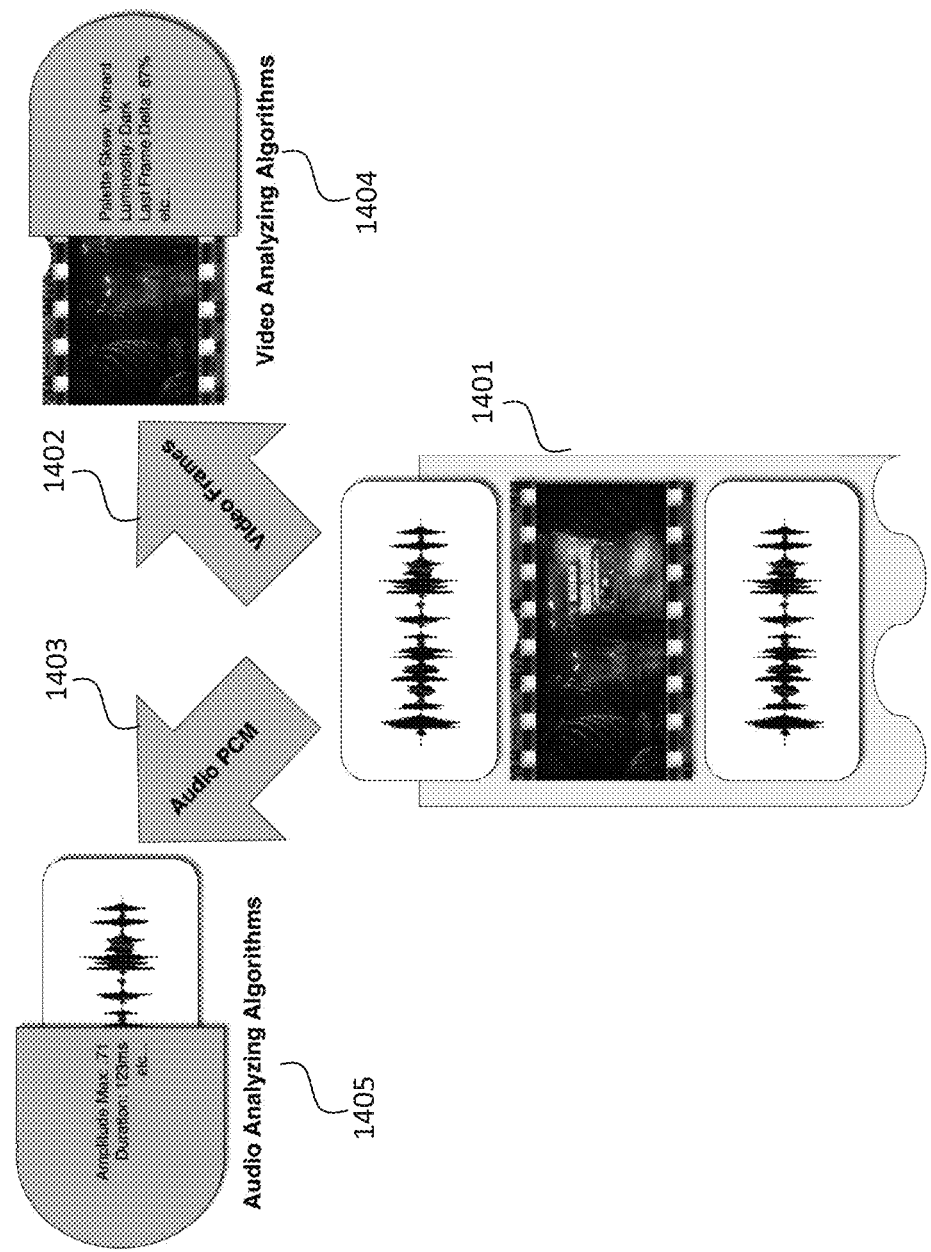
FIG. 14 depicts the data flow of processing audio & video packets from an elementary stream in a media source.

FIG. 14 depicts an embodiment of an exemplary data flow for processing audio and video packets from an elementary stream in a media source 1303, to perform automated analysis of a temporal A/V element. Automated analysis of an A/V element data can give the system guidelines to most needed changes to the GUI. Digitally encoded audio and video can be extracted from an elementary stream 1401 as a frame image (video) 1402 or pulse-code modulation (PCM) audio segment 1403. In a standard player, these pieces are rendered and synchronized during audio/video playback. However, these packets can also be fed into various algorithms, such as video analyzing algorithms 1404 and audio analyzing algorithms 1405, to analyze the properties of the audio and video. Some examples of data derived from these types of analyses are edit detection metrics, color-palette skew (e.g. warm, cool, vibrant, pastel, etc.) gamma and histogram distribution of color, luma (i.e. brightness) face recognition, song recognition, and peaks in audio amplitude. For example, the result of video analyzing algorithms 1404 shows that palette skew is vibrant; luminosity is dark; last frame delta is 87%, etc., and the result of audio analyzing algorithms 1405 shows that amplitude max is 0.71, duration is 123 ms, etc. The results of these analyses can be mapped to a timeline using the timestamps that are built into the digital video format meant to synchronize audio and video playback. One example of this form of timestamps is the presentation timestamp (PTS) of the MPEG-2 transport stream. The result of this process is a collection of information about the audio and video mapped to the timeline of a specific media title.

Referring back to FIG. 13, existing media databases 1305 store non-time-related, contextual information about media titles. Using the title of the media in question, these databases can provide data such as filmmakers, genres, release dates, series or serial relationships, and so on.

Figure 15:
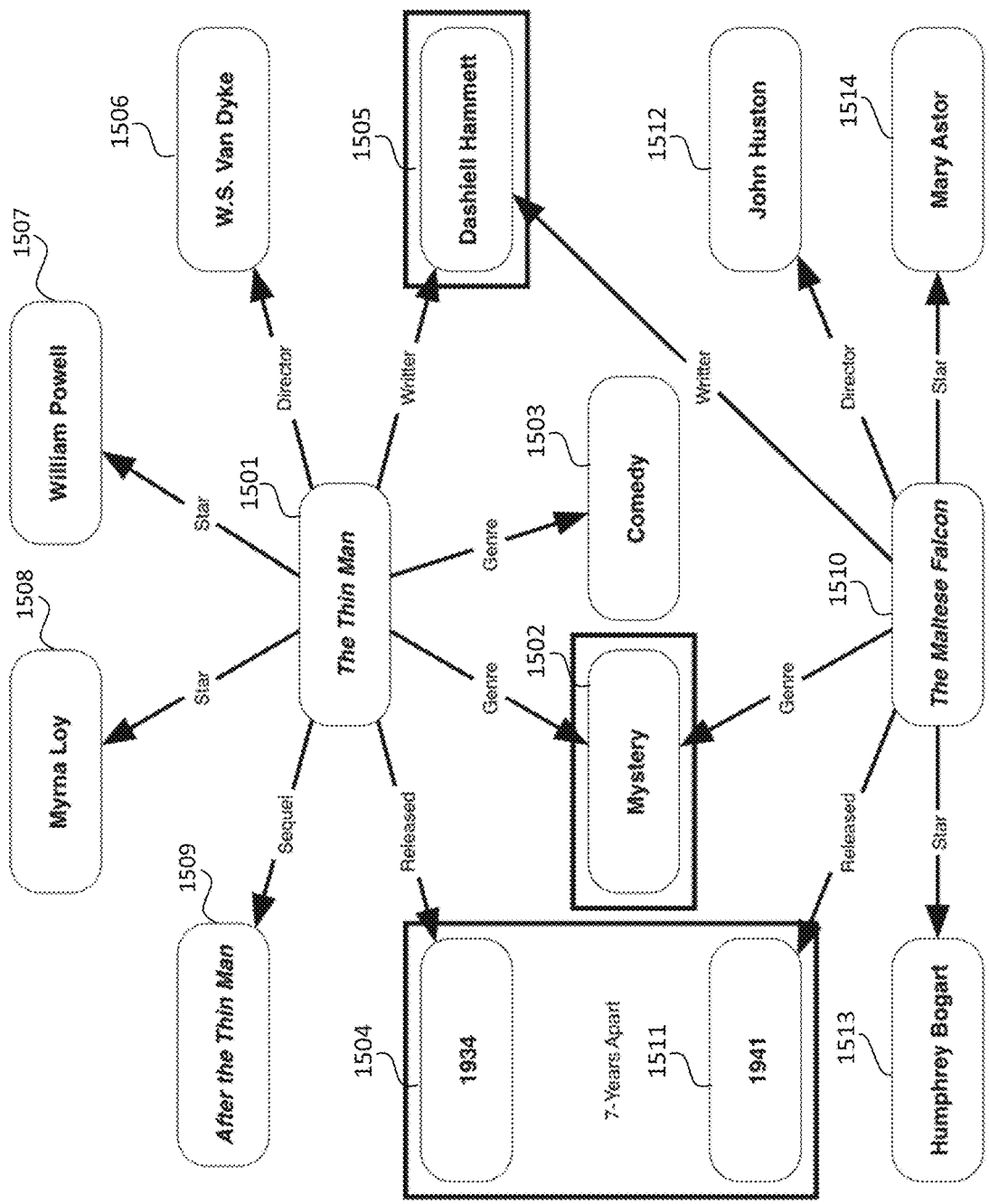
FIG. 15 illustrates an example of finding relationships between films to estimate GUI triggers.

In various embodiments the system is configured to process contextual data. FIG. 15 illustrates an example of finding relationships between films to estimate GUI triggers. Each of these data points can be queried to find other media titles similar to the original media title. For example, a query of the film The Thin Man 1501 could return that the film's genres are mystery 1502 and comedy 1503, and the release year 1504 of the film is 1934. The film's writer is Dashiell Hammett 1505, and the director is W. S. Van Dyke 1506. The stars in the film include William Powell 1507 and Myrna Loy 1508. The film has a sequel which is After the Thin Man 1509. Further analysis of these attributes of The Thin Man 1501 would reveal several similarities to the film The Maltese Falcon 1510 whose release year 1511 is 1941, since they share the same writer Dashiell Hammett 1505, same genre mystery 1502 and same general era attribute, e.g. 7 year apart. It also shows that the director of film The Maltese Falcon 1510 is John Huston 1512, and the stars include Humphrey Bogart 1513 and May Astor 1514. This relational information could prove important if a system has an AV-Element Analysis of The Thin Man 1501, but not of The Maltese Falcon 1510. In this case it may be viable to use some generalized (non-temporal) GUI modifications determined or defined for The Thin Man 1501 during playback of The Maltese Falcon 1510.

Referring back to FIG. 13, data providers 1307 may provide other temporal data, for example contextual and temporal information 1308 for events that occur in film that are difficult or impossible to determine programmatically and automatically as described above. For example the geographical setting within the narrative space is very difficult to determine from video analysis of the frame images, especially if the location in question only exists in the fictional space of the media. Other examples include era, art direction and props. All of this information can be manually entered by human contributors and attached to moments along the timeline. For example, a person can note that a film takes place in a Victorian mansion in rural England during specific moments. Now the location, era, and artistic styling of the narrative space can be stored in a database along with the times within the film during which this data is valid.

As shown in FIG. 13, the data collected from three data sources may be linked together using the common data markers of the film and the timeline of the film. That is, from time x to time y in a specific media title, the video analyzer and data input application 1301 performs a digital analysis of the audio and video combined with the temporal data provided by human contributors. There is general information about the media title for estimating unknown data from other related media titles. The aggregated data is generated and the video analyzer & data input application 1301 sends the contextually and temporally synchronized visual palettes 1302, i.e., a data map, to database 1309.

Figure 16:
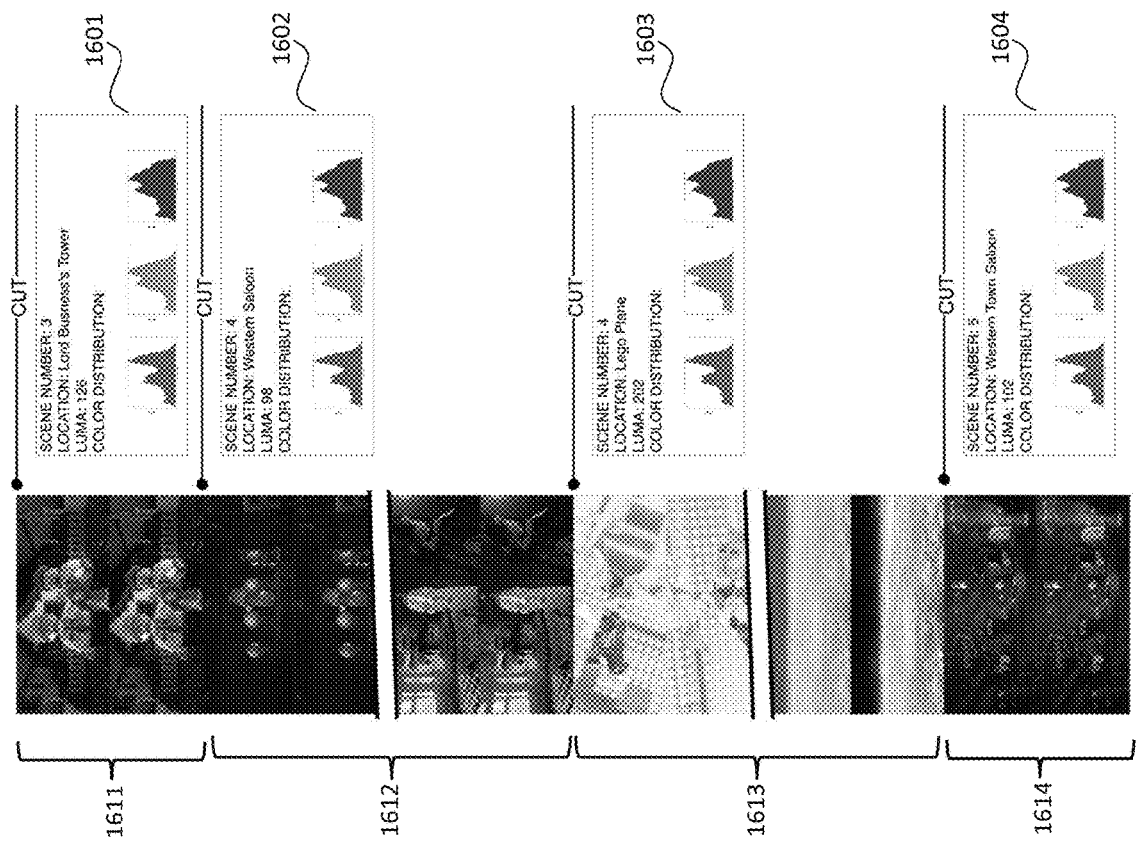
FIG. 16 illustrates an example of segments of a data map.

FIG. 16 illustrates an example of segments of a data map. Segment 1601, which includes the information of cut 1611, indicates scene number is 3, location of the cut is Lord Busness's Tower, luma of the cut is 126, and color distribution of the cut 1611 which is illustrated by histograms showing the intensity of Red, Green, and Blue. Similarly, segment 1602, which includes the information of cut 1612, indicates scene number is 4, location of the cut is Western Saloon, luma of the cut is 98, and color distribution of the cut 1612. Segment 1603, which includes the information of cut 1613, indicates scene number is 4, location of the cut is Lego Plane, luma of the cut is 202, and color distribution of the cut 1613. Segment 1604, which includes the information of the cut 1614, indicates scene number is 5, location of the cut is Western Town Saloon, luma of the cut is 102, and color distribution of the cut 1614.

In various embodiments the data map can be used to create trigger events within the database that tell the companion application how and when to change its GUI at specific moments of the film. These GUI adjustment triggers can be created manually with the creator of the trigger using the data map as reference. Triggers can also be created automatically using the AV-Element data to guide changes like color, volume, or brightness.

For example, the GUI adjustments may be simple changes like adjusting the brightness or volume of the companion application to complement the source media as it changes throughout playback, or adjustments may be complicated changes like re-skinning the entire GUI to match the current era of a time-traveling character as he or she jumps through centuries within a film.

Figure 17:
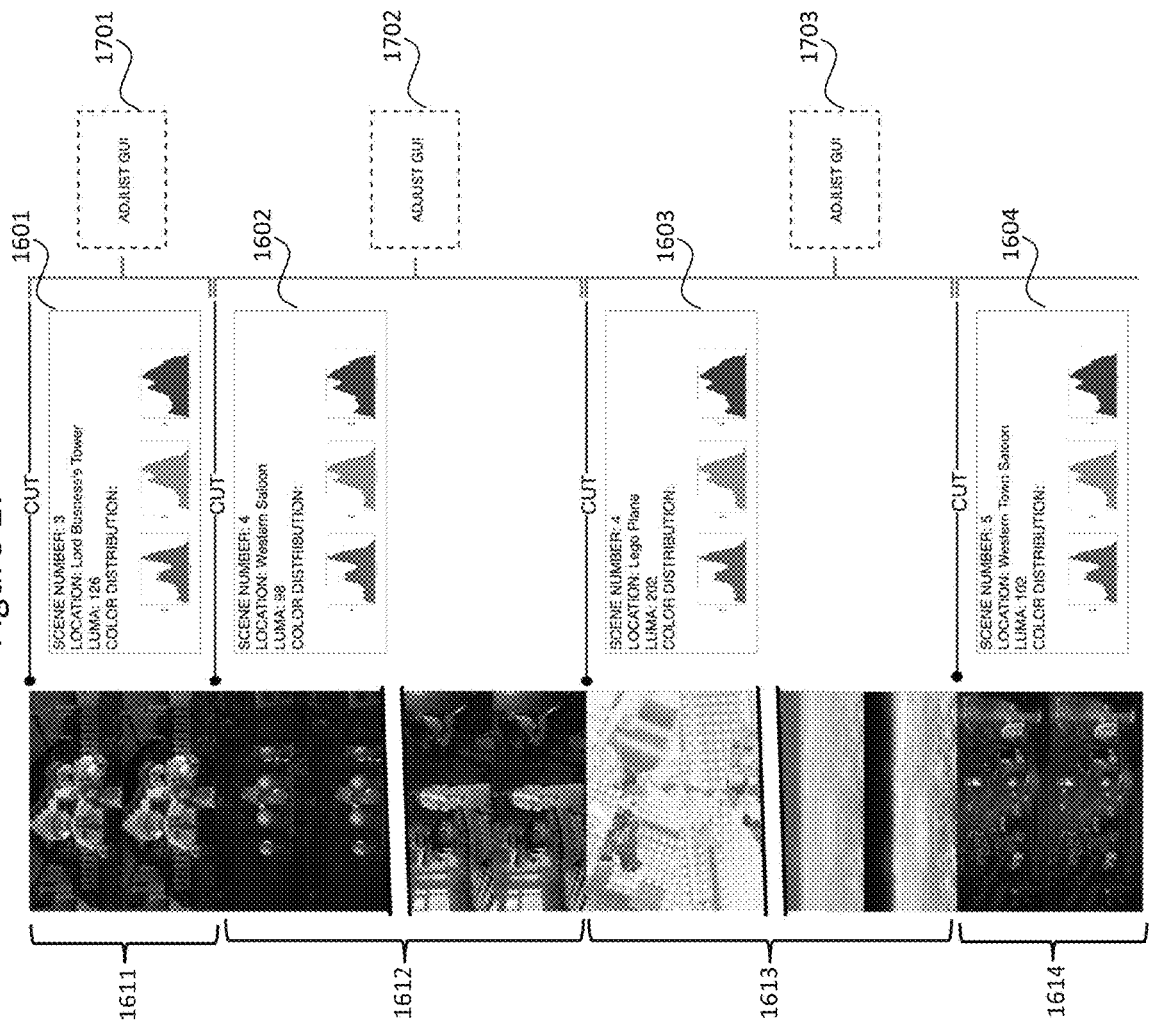
FIG. 17 illustrates an example of segments of a data map with GUI triggers.

FIG. 17 illustrates an example of segments of a data map with GUI triggers. For example, if the GUI adjustment triggers is created based on the luma of the cut, as shown in FIG. 17, the GUI adjustment 1701 may adjust the brightness of the companion application to complement the cut 1611 whose luma is 126. Similarly, if the GUI adjustment triggers is created based on the color distribution of the cut, the GUI adjustment 1702 may adjust the color of the companion application to complement the color distribution of the cut 1612. If the GUI adjustment triggers is created based on the location of the cut, the GUI adjustment 1703 may adjust the volume of the companion application, for example, to increase the volume, to complement the cut 1613 whose location is Lego Plane which, for example, is very noisy.

After the GUI adjustment triggers are created, referring back to FIG. 13, the database 1309 sends the contextually and temporally synchronized GUI instruction 1310 which includes the GUI adjustment triggers to the second device 1311. The primary screen 1312 and the second device 1311 may be located in the same viewing room 1320. Therefore, the contrast between the different ambient light produced by the primary screen and the second screen can be avoided by sending GUI adjustment triggers to adjust the second screen to complement media played on the primary screen.

Accordingly, disclosed is a system which is capable of delivering synchronized metadata to a target device for a specific piece of media. The metadata delivery stream includes externally sourced peripheral specific binary control data packets. The binary data packets are not rendered by the target device, but rather broadcast in a synchronized fashion to any connected peripheral. The binary data packets are only fully interpreted by the peripheral itself.

Further, disclosed is a system capable of delivering synchronized metadata to a media playback target device, such as a set top box or tablet. The target device forwards some of the metadata to connected intelligent peripherals. In various embodiments, a metadata packet can be configured for peripherals that are able to generate data and send that data back to the target device. The packet can include a payload to be sent to the peripheral and a response handler, which gets processed on the target device in parallel with the peripheral processing the payload. The response handler includes a set of target device independent actions to be taken as well as instructions for how to interpret data generated by the peripheral. In order to process the response handler actions and instructions, the target device may be extended with an interpreter.

While the invention has been described and illustrated in connection with various embodiments, many variations and modifications as will be evident to those skilled in this art may be made without departing from the scope of the invention, and the invention is thus not to be limited to the precise details of methodology or construction set forth above, as such variations and modification are intended to be included within the scope of the invention. Therefore, the scope of the appended claims should not be limited to the description and illustrations of the embodiments contained herein.

What is claimed is:

1. A system comprising:
a wireless interface;
one or more processors; and
memory accessible to the one or more processors, the memory storing instructions that, upon execution by the one or more processors, causes the one or more processors to perform operations to:
provide, to a media device using the wireless interface, peripheral identification information, the peripheral identification information associated with a peripheral device;
receive, from the media device using the wireless interface and based on peripheral addressing information, timing information used to synchronize movement of the peripheral device with media;
generate peripheral device movement data using at least one movement sensor;
synchronize the peripheral device movement data with the media using the timing information; and
make the synchronized peripheral device movement data available to the media device using the wireless interface.

2. The system of claim 1, wherein the instructions that, upon execution by the one or more processors, causes the one or more processors to perform operations to receive at least one trigger-point causing adjustment of an output associated with a companion application at a specific time point of the media.

3. The system of claim 2, wherein the at least one trigger-point is based on a data map using aggregating media information from a plurality of data sources along a timeline of the media.

4. The system of claim 3, wherein the plurality of data sources include one or more of an automated analysis result of audio and video data of the media, contextual information about the media, and manually entered data from annotators or crowd-sourcing applications.

5. The system of claim 2, wherein the adjustment of the output includes adjusting display settings of a screen, volume of the companion application, movement of a mechanism, or re-skinning of an interface.

6. The system of claim 1, wherein the instructions that, upon execution by the one or more processors, causes the one or more processors to perform operations to perform a set of movements associated with operation of another device.

7. The system of claim 1, wherein the instructions that, upon execution by the one or more processors, causes the one or more processors to perform operations to perform a discovery process by exchanging identification data with the media device.

8. A method comprising:
making available, to a media device using a wireless interface, peripheral identification information, the peripheral identification information associated with a peripheral device;
receiving, from the media device via the wireless interface and based on peripheral addressing information, timing information used to synchronize movement of the peripheral device with media;
generating peripheral device movement data using at least one movement sensor;
synchronize the peripheral device movement data with the media using the timing information; and
making the synchronized peripheral device movement data data available to the media device using the wireless interface.

9. The method of claim 8, further comprising receiving at least one trigger point causing adjustment of an output associated with an interface at a specific time point of the media.

10. The method of claim 8, further comprising output of an interface at a specific time point of the media synchronized with the media device.

11. A non-transitory computer readable medium comprising instructions that when executed by one or more processing devices, cause the one or more processing devices to:

provide, to a media device using a wireless interface, peripheral identification information, the peripheral identification information associated with a peripheral device;

receive, from the media device using the wireless interface and based on peripheral addressing information, timing information used to synchronize movement of the peripheral device with media;

generate peripheral device movement data using at least one movement sensor;

synchronize the peripheral device movement data with the media using the timing information perform the at least one action related to the media based on the timing information and the action information included in the peripheral payload; generate response data based on; and make the synchronized peripheral device movement data available to the media device using the wireless interface.

12. The non-transitory computer readable medium of claim 11, wherein the instructions that when executed by the one or more processing devices, further cause the one or more processing devices to receive at least one trigger-point causing adjustment of an output associated with a companion application at a specific time point of the media.

13. The non-transitory computer readable medium of claim 12, wherein the at least one trigger-point is based on a data map using aggregated media information from a plurality of data sources along a timeline of the media.

14. The non-transitory computer readable medium of claim 13, wherein the plurality of data sources include one or more of an automated analysis result of audio and video data of the media, contextual information about the media, and manually entered data from annotators or crowd-sourced applications.

15. The non-transitory computer readable medium of claim 12, wherein the adjustment of the output includes adjusting display settings of a screen, volume of the companion application, movement of a mechanism, or re-skinning of an interface.

16. The non-transitory computer readable medium of claim 11, wherein the instructions that when executed by the one or more processing devices, further cause the one or more processing devices to perform a set of movements associated with operation of another device.

17. The non-transitory computer readable medium of claim 11, wherein the instructions that when executed by the one or more processing devices, further cause the one or more processing devices to perform a discovery process by exchanging identification data with the media device.

* * * * *